(12) United States Patent
Ovrutsky

(10) Patent No.: US 12,345,862 B2
(45) Date of Patent: Jul. 1, 2025

(54) WIDE FIELD OF VIEW IMAGING SYSTEMS AND METHODS

(71) Applicant: Teledyne FLIR Commercial Systems, Inc., Goleta, CA (US)

(72) Inventor: David Ovrutsky, Charlotte, NC (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 0 days.

(21) Appl. No.: 17/515,339

(22) Filed: Oct. 29, 2021

(65) Prior Publication Data

US 2023/0140342 A1  May 4, 2023

(51) Int. Cl.
| | |
|---|---|
| G02B 13/00 | (2006.01) |
| G06T 7/80 | (2017.01) |
| H04N 17/00 | (2006.01) |
| H04N 23/51 | (2023.01) |
| H04N 23/55 | (2023.01) |
| H04N 23/698 | (2023.01) |

(52) U.S. Cl.
CPC ....... *G02B 13/0085* (2013.01); *G02B 13/003* (2013.01); *G02B 13/008* (2013.01); *G06T 7/80* (2017.01); *H04N 17/002* (2013.01); *H04N 23/51* (2023.01); *H04N 23/55* (2023.01); *H04N 23/698* (2023.01)

(58) Field of Classification Search
CPC .............. G02B 13/0085; G02B 13/003; G02B 13/008; G06T 7/80; H04N 5/2252; H04N 5/2254; H04N 5/23238; H04N 17/002
See application file for complete search history.

(56) References Cited

U.S. PATENT DOCUMENTS

| | | |
|---|---|---|
| 8,848,301 B2 | 9/2014 | Welch et al. |
| 8,885,257 B2 | 11/2014 | Ovrutsky et al. |
| 9,910,239 B2 | 3/2018 | Ovrutsky et al. |
| 10,818,550 B2 | 10/2020 | Ovrutsky et al. |

(Continued)

FOREIGN PATENT DOCUMENTS

| | | | |
|---|---|---|---|
| CN | 105635534 A | * | 6/2016 |
| WO | WO 2022066782 A1 | | 3/2022 |

OTHER PUBLICATIONS

NPL Wikipedia Shutter.*
NPL A Whirlwind Tour of Leaf Shutter Diaphragms.*

*Primary Examiner* — Shadan E Haghani
(74) *Attorney, Agent, or Firm* — Haynes and Boone, LLP

(57) ABSTRACT

Techniques for facilitating wide field of view (FOV) imaging systems and methods are provided. In one example, an imaging device includes a lens system including a first lens group and a second lens group. The first lens group includes at least one spherical lens element and is associated with a first FOV. The first lens group is configured to transmit electromagnetic radiation associated with a scene. The second lens group includes wafer level optics aspherical lens elements and is associated with a second FOV narrower than the first FOV. The second lens group is configured to transmit the electromagnetic radiation received from the first lens group. The imaging device further includes a detector array including detectors. Each detector is configured to receive a portion of the electromagnetic radiation from the lens system and generate a thermal image based on the electromagnetic radiation. Related methods and systems are also provided.

20 Claims, 15 Drawing Sheets

(56) References Cited

U.S. PATENT DOCUMENTS

| | | |
|---|---|---|
| 11,063,159 B2 | 7/2021 | Gershtenman-Avsian et al. |
| 2009/0225405 A1* | 9/2009 | Fujimoto ............... G02B 13/06 |
| | | 359/356 |
| 2010/0309368 A1* | 12/2010 | Choi ................. G02B 13/0035 |
| | | 359/503 |
| 2014/0139643 A1* | 5/2014 | Hogasten ............... H04N 23/45 |
| | | 348/48 |
| 2014/0334016 A1* | 11/2014 | Yin .................... G02B 13/0045 |
| | | 359/716 |
| 2016/0349228 A1* | 12/2016 | Kester ................... G01J 5/0014 |
| 2017/0097499 A1* | 4/2017 | Cheng ................... G02B 13/14 |
| 2020/0218043 A1* | 7/2020 | Cheng ............... G02B 13/0035 |
| 2021/0312151 A1* | 10/2021 | Scherly ..................... G06T 7/73 |
| 2022/0221691 A1 | 7/2022 | Walters et al. |
| 2022/0326514 A1 | 10/2022 | Fitzgerald et al. |

* cited by examiner

WIDE FIELD OF VIEW IMAGING SYSTEMS AND METHODS

TECHNICAL FIELD

One or more embodiments relate generally to optical components and more particularly, for example, to wide field of view imaging systems and methods.

BACKGROUND

Imaging systems may include an array of detectors arranged in rows and columns, with each detector functioning as a pixel to produce a portion of a two-dimensional image. For example, an individual detector of the array of detectors captures an associated pixel value. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an imaging device includes a lens system. The lens system includes a first lens group including at least one spherical lens element. The first lens group is configured to transmit electromagnetic radiation associated with a scene. The first lens group is associated with a first field of view. The lens system further includes a second lens group includes a plurality of wafer level optics aspherical lens elements. The second lens group is configured to receive the electromagnetic radiation from the first lens group and transmit the electromagnetic radiation. The second lens group is associated with a second field of view narrower than the first field of view. The imaging device further includes a detector array including a plurality of detectors. Each of the plurality of detectors is configured to receive a portion of the electromagnetic radiation from the lens system and generate a thermal image based on the electromagnetic radiation.

In one or more embodiments, a method of manufacturing the imaging device includes providing the detector array. The method further includes disposing the detector array within a housing. The method further includes disposing the second lens group within a first portion of a lens barrel. The method further includes coupling the first portion of the lens barrel to the housing. The method further includes performing a calibration of the second lens group to obtain a gain map. The method further includes disposing the first lens group within a second portion of the lens barrel. The method further includes, after the calibration, coupling the second portion of the lens barrel to the first portion of the lens barrel.

In one or more embodiments, a method includes directing, by a lens system including a first lens group and a second lens group, electromagnetic radiation associated with a scene to a detector array. The first lens group is associated with a first field of view and includes at least one spherical lens element. The second lens group is associated with a second field of view narrower than the first field of view and includes a plurality of wafer level optics aspherical lens elements. The method further includes receiving, by the detector array, the electromagnetic radiation. The method further includes generating, by the detector array, a thermal image based on the electromagnetic radiation and a gain map, where the gain map is based on a calibration of the second lens group.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
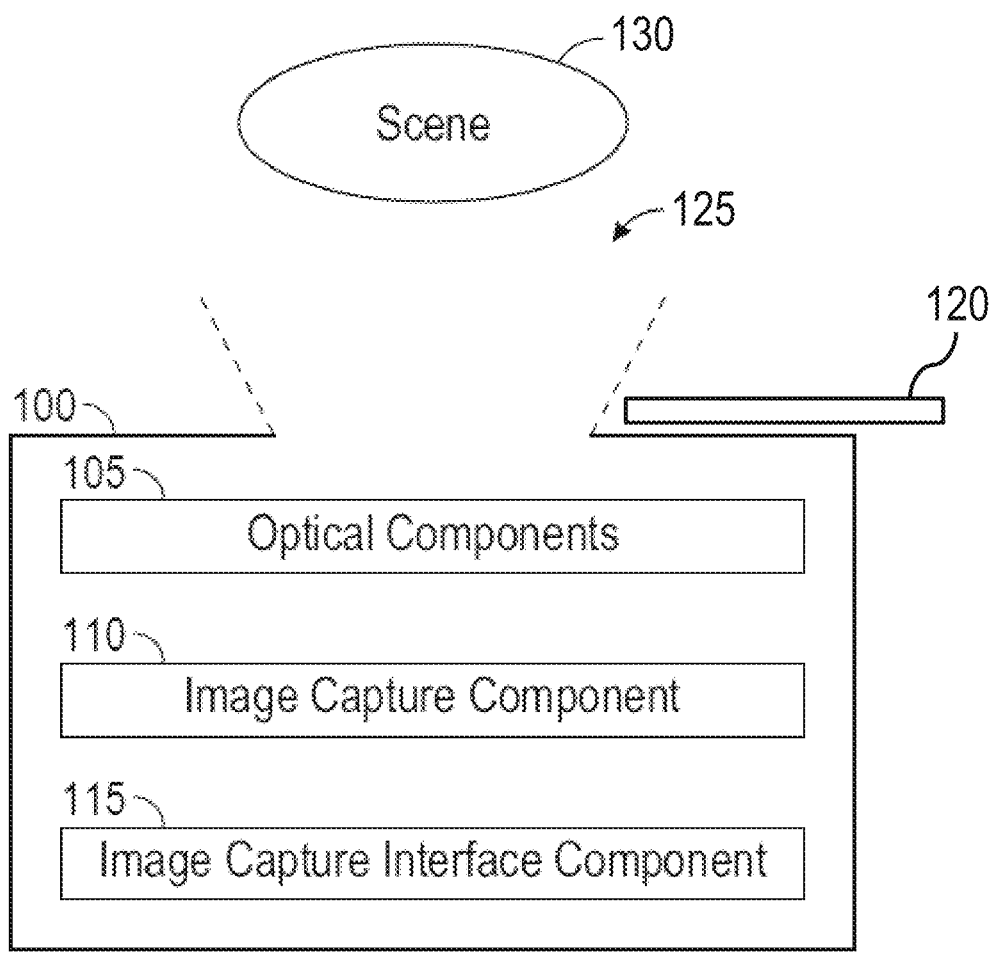
FIG. 1 illustrates a block diagram of an imaging device in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, wide field of view imaging systems and methods are provided. In some aspects, such systems and methods may be used for infrared imaging, such as thermal infrared imaging. In one embodiment, an imaging device includes a detector array, an optical element(s) to direct electromagnetic radiation associated with a scene to the detector array, and a lens barrel within which to dispose and hold/secure the optical element(s). The imaging device may include a housing coupled to the lens barrel. The housing may include (e.g., enclose) the detector array. In some cases, the housing may include a logic device to process image data from the detector array, memory to store raw image data and/or processed image data, a battery, and/or other components to facilitate operation of the imaging device. By way of non-limiting examples, an optical element may include a lens element, a window, a mirror, a beamsplitter, a beam coupler, and/or other component. In an aspect, the imaging device includes a lens system including a front lens group (e.g., also referred to as a front focusing group) and a rear lens group (e.g., also referred to as a rear focusing group). In some cases, the imaging device may also include other optical elements upstream of the lens elements, downstream of the lens elements, and/or interspersed between two lens elements.

The detector array may receive electromagnetic radiation directed (e.g., projected, transmitted) by the lens element(s) onto the detector array. In this regard, the electromagnetic radiation may be considered image data. The detector array may generate an image based on the electromagnetic radiation. The lens element(s) and/or other optical element(s) of the imaging device may be transmissive of electromagnetic radiation within a waveband dependent on a desired application. In an aspect, the imaging device may be an infrared imaging device for facilitating capture of a waveband encompassing at least a portion of the thermal infrared spectrum, such as a long-wave infrared (LWIR) spectrum. In infrared imaging applications, the detector array may include an array of microbolometers and/or an array of other types of infrared detectors. As non-limiting examples, a lens element may include silicon, germanium, chalcogenide glass (e.g., $As_{40}Se_{60}$), germanium arsenide selenium (Ge-AsSe), $Ge_{22}As_{20}Se_{58}$, $Ge_{33}As_{12}Se_{5}$, zinc selenide, organic material such as polyethylene and 4-methylpentene-1-based olefin copolymer (TPX), and/or generally any lens material appropriate for infrared applications. Lens material used to manufacture the lens element(s), respectively, are generally based on a desired application. For example, lens material may be selected to allow a desired transmission waveband of the lens elements.

In some embodiments, a wide field of view imaging device, such as an ultra-wide field of view (UWFOV), may include lens elements formed using wafer level optics (WLO) manufacturing processes. In some aspects, the imaging device may be an LWIR camera. As a non-limiting range, an UWFOV imaging device may provide a field of view (FOV) between around 110° and around 220° (e.g., around 120° and around 160° in some cases). In this regard, in some cases, a lens system of the imaging device may be designed to provide an FOV that exceeds 180° to allow the imaging device to capture scene data (e.g., image data in the form of electromagnetic radiation) behind the imaging device.

WLO manufacturing processes, such as polymer formation on a substrate followed by a transfer etch, are generally associated with lower costs than other manufacturing processes and thus having the option to use, in an imaging device, lens elements formed using WLO manufacturing processes allows for cost savings. Lens elements formed as part of a wafer-level procedure may then be singulated to obtain individual lens elements that can be disposed in imaging devices. Lens shapes used in UWFOV applications generally lie outside of WLO manufacturing design rules. In this regard, WLO processes impose limitations on lens shapes that can be produced. As typical examples of WLO manufacturing design rules, a maximum lens sag should not exceed 0.3 mm and a maximum slope along the curvature should not exceed around 15° or 16°.

To provide ultra-wide FOV imaging capabilities, the imaging device includes a front lens group and a rear lens group, where each lens group includes one or more lens elements. The rear lens group may be formed/produced using WLO processes (e.g., due to their lower costs relative to other manufacturing processes). As such, the lens element(s) of the rear lens group is designed to meet the rules associated with WLO manufacturing and thus has lower sag and lower slope. In some cases, the lens element(s) of the rear lens group is an aspherical lens element(s). The front lens group may be formed/produced using grinding processes, polishing processes, diamond turning processes, and/or molding processes. In some aspects, both curvatures of a lens element(s) of the front lens group may be designed to be spherical. The curvatures may be produced using grinding/polishing processes to provide a double-side polished spherical lens element. In such aspects, leveraging the spherical shape of the spherical lens elements, the spherical lens element(s) of the front lens group may be formed/produced with grinding/polishing processes, which are generally less expensive than diamond point turning or molding processes. As such, cost effective processes may be used to form the front lens group and/or the rear lens group dependent on application.

The lens element(s) of the front lens group may have larger sag and steeper slope to collectively provide the UWFOV. In this regard, the front lens group may be designed to provide a desired FOV for the imaging device. In an aspect, the front lens group may be referred to as a front fisheye group. The lens element(s) of the rear lens group may collectively provide an FOV that is narrower than the FOV provided by the front lens group. Thus, using various embodiments, lower costs associated with WLO manufacturing may be achieved together with ultra-wide FOV imaging by designing the lens element(s) of the rear group lens to meet the rules associated with WLO manufacturing, while designing the lens element(s) of the front group lens with the larger sag and steeper slopes appropriate to allow image capture of an ultra-wide FOV scene.

In some embodiments, forming the front lens group using one or more spherical lens elements allows for mitigation of calibration and gain correction process challenges that may be associated with an UWFOV. By using a spherical lens element(s), a calibration and gain correction process may be performed using just the rear lens group (e.g., without the front lens group). The front lens group may then be installed in front of the rear lens group after such a calibration and gain correction process. As further described herein, when the front lens group is formed of one or more spherical lens elements, a relative illumination (RI) curve associated with just the rear lens group is substantially the same as an RI curve associated with the front lens group together with the rear lens group. The property that the spherical shape of the lens element(s) of the front lens group does not alter (e.g., has a minimal or no effect on) the resultant RI curve allows the calibration and gain correction process to be performed with just the rear lens group. A gain map may be determined based at least in part on the RI curve determined using just the rear lens group. In this regard, the front lens group may be positioned in front of the rear lens group after calibration of the rear lens group without altering the gain map determined from the calibration using just the rear lens group.

Using just the rear lens group allows for a calibration setup that is generally easier to implement than one that involves the front and rear lens groups. A calibration setup for a wide FOV lens element such as the front lens element(s) involves capturing images of a correspondingly large blackbody (e.g., large flat uniform blackbody of a known temperature) that subtends the entire FOV produced by the wide FOV lens element whereas the calibration setup associated with using just the rear lens group involves capturing images of a smaller blackbody (e.g., more readily available and/or easier to implement than a larger blackbody) that subtends the smaller FOV produced by the rear lens group (e.g., compared to the FOV produced by the rear lens group together with the front lens group). As such, using various embodiments, arrangements of lens elements as set forth in accordance with various embodiments may allow beneficial cost and process (e.g., manufacturing process, gain calibration process) characteristics in relation to imaging device (e.g., UWFOV LWIR cameras) manufacturing and operation.

Although various embodiments are described primarily with respect to infrared imaging, methods and systems disclosed herein may be utilized in conjunction with devices and systems such as imaging systems having visible-light and infrared imaging capability, mid-wave infrared (MWIR) imaging systems, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum.

Referring now to the drawings, FIG. 1 illustrates a block diagram of an imaging device 100 in accordance with one or more embodiments of the present disclosure. In an embodiment, the imaging device 100 may be an infrared imaging device. The imaging device 100 may be used to capture and process image frames. The imaging device 100 includes optical components 105, an image capture component 110, an image capture interface component 115, and an optional shutter component 120.

The optical components 105 may receive electromagnetic radiation through an aperture 125 of the imaging device 100 and pass the electromagnetic radiation to the image capture component 110. For example, the optical components 105 may direct and/or focus electromagnetic radiation on the image capture component 110. The optical components 105 may include one or more windows, lenses, mirrors, beamsplitters, beam couplers, and/or other components. In an embodiment, the optical components 105 may include one or more chalcogenide lenses, such as lenses made of $As_{40}Se_{60}$, that allow for imaging in a wide infrared spectrum. Other materials, such as silicon, germanium, and GeAsSe, may be utilized. The optical components 105 may include components each formed of material and appropriately arranged according to desired transmission characteristics, such as desired transmission wavelengths and/or ray transfer matrix characteristics.

The image capture component 110 includes, in one embodiment, one or more sensors (e.g., visible-light sensor, infrared sensor, or other type of detector) for capturing image signals representative of an image of a scene 130. The image capture component 110 may capture (e.g., detect, sense) infrared radiation with wavelengths in the range from around 700 nm to around 1 mm, or portion thereof. For example, in some aspects, the image capture component 110 may include one or more sensors sensitive to (e.g., better detect) thermal infrared wavelengths, including LWIR radiation (e.g., electromagnetic radiation with wavelength of 7-14 µm). The sensor(s) of the image capture component 110 may represent (e.g., convert) or facilitate representation of a captured thermal image signal of the scene 130 as digital data (e.g., via an analog-to-digital converter).

The image capture interface component 115 may receive image data captured at the image capture component 110 and may communicate the captured image data to other components or devices, such as via wired and/or wireless communication. In various embodiments, the imaging device 100 may capture image frames, for example, of the scene 130.

In some embodiments, the optical components 105, image capture component 110, and image capture interface component 115 may be housed in a protective enclosure. In one case, the protective enclosure may include a lens barrel (e.g., also referred to as a lens housing) that houses the optical components 105 and a housing that houses the image capture component 110 and/or the image capture interface component 115. In this case, the lens barrel may be coupled to the housing.

In an aspect, the protective enclosure may be represented by the solid-line box in FIG. 1 having the aperture 125. For example, the aperture 125 may be an opening defined in the protective enclosure that allows electromagnetic radiation to reach the optical components 105. In some cases, the aperture 125 may be an aperture stop of the imaging device 100.

Each optical element (e.g., lens element) may include at least one mating feature (e.g., also referred to as a mounting feature). The lens barrel may have a corresponding mating feature(s) that couples to a mating feature(s) of the optical element(s) to receive and secure the optical element(s). In this regard, each mating feature of an optical element may couple to a corresponding mating feature of the lens barrel to couple the optical element to the lens barrel. In one example, a mating feature of an optical element may include a first surface and a second surface at an angle (e.g., 90° angle, obtuse angle, or acute angle) relative to the first surface, and a mating feature of a lens barrel may have corresponding surfaces to couple to the first and second surfaces. In another example, a mating feature of an optical element may include a pin portion, and a mating feature of a lens barrel may include a slot portion to receive the pin portion, and/or vice versa. More generally, a mating feature(s) of an optical element and a corresponding mating feature(s) of a lens barrel may be any structure (e.g., indentation, hole, pin, or other structure) that facilitates coupling of the optical element to the lens barrel.

In some cases, a mating feature of a lens element may be appropriate to facilitate rotation and/or other movement of the lens element. In some cases, a mating feature may be utilized to facilitate alignment of a lens element, such as via pattern recognition during molding, machining, and/or assembling. For example, one or more mating features on a surface of a lens element can be located (e.g., using pattern recognition to scan the surface) to facilitate machining of a different surface of the lens element according to a desired design. As another example, a mating feature(s) of a surface(s) of a first lens element and/or a mating feature(s) of a surface(s) of a second lens element may be utilized to facilitate alignment of the first lens element relative to the second lens element.

The shutter component 120 may be operated to selectively inserted into an optical path between the scene 130 and the optical components 105 to expose or block the aperture 125. In some cases, the shutter component 120 may be moved (e.g., slid, rotated, etc.) manually (e.g., by a user of the imaging device 100) and/or via an actuator (e.g., controllable by a logic device in response to user input or autonomously, such as an autonomous decision by the logic device to perform a calibration of the imaging device 100). When the shutter component 120 is outside of the optical path to expose the aperture 125, the electromagnetic radiation from the scene 130 may be received by the image capture component 110 (e.g., via one or more optical components and/or one or more filters). As such, the image capture component 110 captures images of the scene 130. The shutter component 120 may be referred to as being in an open position or simply as being open. When the shutter component 120 is inserted into the optical path to block the aperture 125, the electromagnetic radiation from the scene 130 is blocked from the image capture component 110. As such, the image capture component 110 captures images of the shutter component 120. The shutter component 120 may be referred to as being in a closed position or simply as being closed.

In some aspects, the shutter component 120 may block the aperture 125 during a calibration process, in which the shutter component 120 may be used as a uniform blackbody (e.g., a substantially uniform blackbody). For example, the shutter component 120 may be used as a single temperature source or substantially single temperature source. In some cases, the shutter component 120 may be temperature controlled to provide a temperature controlled uniform blackbody (e.g., to present a uniform field of radiation to the image capture component 110). For example, in some cases, a surface of the shutter component 120 imaged by the image capture component 110 may be implemented by a uniform blackbody coating. In some cases, such as for an imaging device without a shutter component or with a broken shutter component or as an alternative to the shutter component 120, a case or holster of the imaging device 100, a lens cap, a cover, a wall of a room, or other suitable object/surface may be used to provide a uniform blackbody (e.g., substantially uniform blackbody) and/or a single temperature source (e.g., substantially single temperature source).

Although in FIG. 1 the shutter component 120 is positioned in front of (e.g., closer to the scene 130 than) all the optical components 105, the shutter component 120 may be positioned between optical components. For example, the optical components 105 may include a first group of one or more lens elements and a second group of one or more lens elements, with the shutter component 120 selectively inserted between a last lens of the first group of lens element(s) and a first lens of the second group of lens element(s). Further, alternatively or in addition, although the shutter component 120 is positioned on or in proximity to an external surface of a housing of the imaging device 100, the shutter component 120 may be positioned within the housing of the imaging device 100. In some aspects, the imaging device 100 may include no shutter components or more than one shutter component.

The imaging device 100 may represent any type of camera system which, for example, detects electromagnetic radiation (e.g., thermal radiation) and provides representative data (e.g., one or more still image frames or video image frames). For example, the imaging device 100 may be configured to detect visible light and/or infrared radiation and provide associated image data. In some cases, the imaging device 100 may include other components, such as a heater, a temperature sensor (e.g., for measuring an absolute temperature of a component of the imaging device 100), a filter, a polarizer, and/or other component. For example, an integrated heater may be coupled to the barrel of the imaging device 100.

Figure 2:
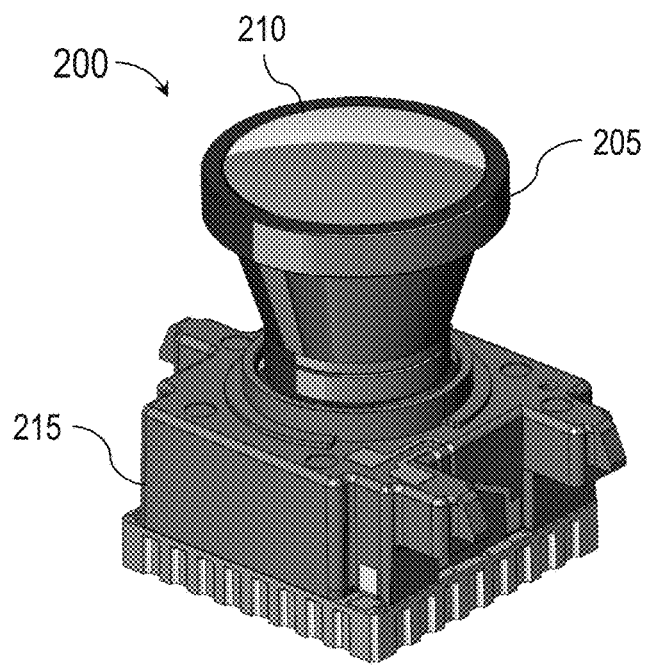
FIG. 2 illustrates a perspective view of an imaging device in accordance with one or more embodiments of the present disclosure.

FIG. 2 illustrates a perspective view of an imaging device 200 in accordance with one or more embodiments of the present disclosure. As one example, the imaging device 200 may be an LWIR thermal camera (e.g., for capturing electromagnetic radiation with wavelengths of 7-14 μm). In other cases, the imaging device 200 may be utilized to capture electromagnetic radiation within other wavelength ranges.

The imaging device 200 may include a lens barrel 205 configured to accommodate at least a lens element 210. The lens barrel 205 may include a structure to hold/secure (e.g., fixedly secure, movably secure) the lens element 210. The imaging device 200 also may include an image capture portion 215 including an image capture component configured to capture images viewed through the lens barrel 205. The image capture portion 215 may include arrays of microbolometers configured to detect EM radiation. As one example, the arrays of microbolometers may be configured to detect long-wave infrared light of wavelengths between 7.5 μm and 13.5 μm. In an embodiment, the lens barrel 205 may be the lens barrel of the imaging device 100 of FIG. 1. In an embodiment, the imaging device 200 may be the imaging device 100 of FIG. 1. In this embodiment, the optical components 105 of FIG. 1 may include at least the lens element 210, and the image capture component 110 of FIG. 1 may include the image capture portion 215.

In some cases, the lens barrel 205 may be configured to accommodate a window in front of (e.g., closer to a scene than) the lens element 210. The window may selectively pass electromagnetic radiation of the scene. In some cases, the window may be a protective window placed in front of the lens element 210 to protect the lens element 210 and/or other components of the imaging device 200 from environmental damage, mechanical damage, and/or other damage. Physical properties (e.g., material composition, thickness and/or other dimensions, etc.) of the window may be determined based on a waveband(s) desired to be transmitted through the window. The lens barrel 205 may include structure to hold/secure (e.g., fixedly secures, movably secures) the window and/or the lens element 210.

Figure 3:
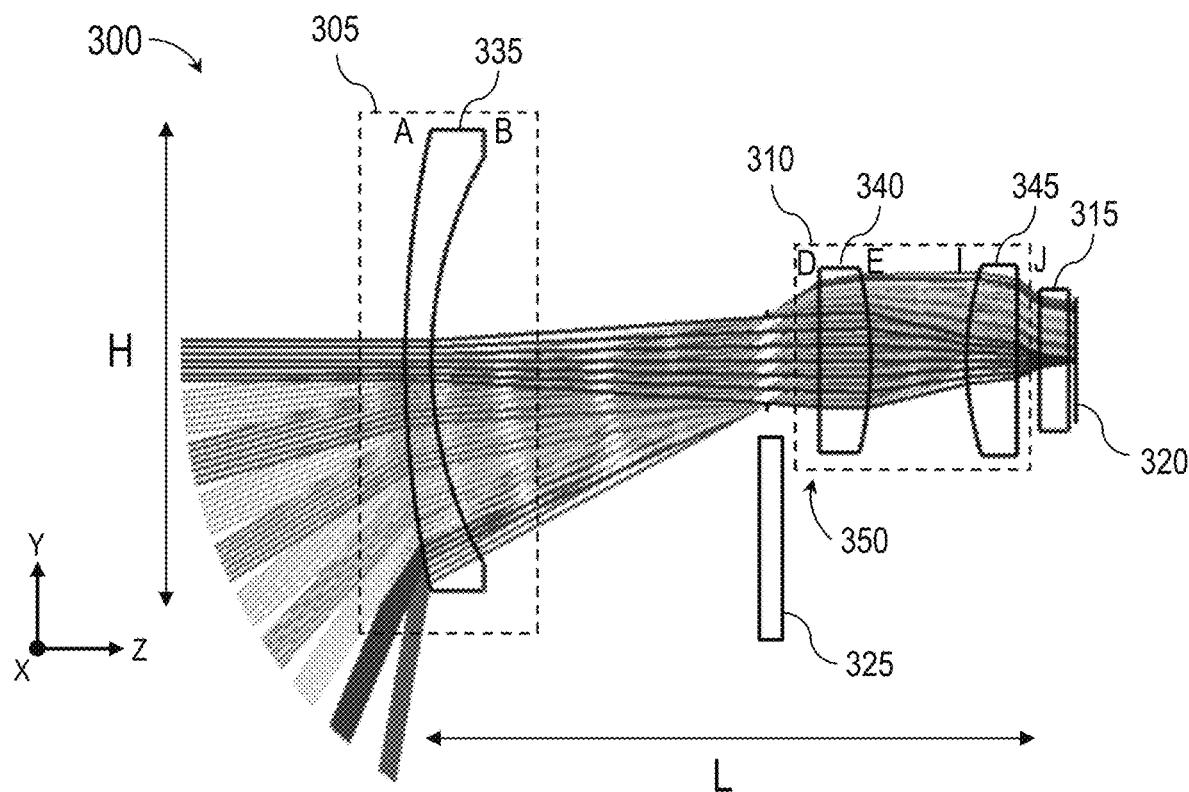
FIG. 3 illustrates a cross-sectional view of an optical system in accordance with one or more embodiments of the present disclosure.

FIG. 3 illustrates a cross-sectional view of an optical system 300 in accordance with one or more embodiments of the present disclosure. The optical system 300 is oriented along three orthogonal directions, denoted as X, Y, and Z. The X-direction and the Y-direction may be referred to as the horizontal direction and the vertical direction, respectively. In particular, FIG. 3 illustrates a cross-sectional view of the optical system 300 in the YZ-plane. The optical system 300 includes a front lens group 305, a rear lens group 310, a window 315, a detector array 320, and a shutter component 325. In an embodiment, the optical components 105 of FIG. 1 may include the front lens group 305, rear lens group 310, and window 315, and the image capture component 110 of FIG. 1 may include the detector array 320.

The front lens group 305 includes a lens element 335. The front lens group 305 may provide a wide FOV, such as an UWFOV. In some aspects, the lens element 335 may be a spherical lens element. The spherical lens element may be formed by grinding/polishing processes. In some cases, both surfaces of the lens element 335 may be spherical. The rear lens group 310 includes lens elements 340 and 345. In some aspects, the lens elements 340 and 345 may be aspherical lens elements. The lens elements 340 and 345 may be formed by WLO processes. In a case that the lens elements 340 and 345 are different, the lens elements 340 and 345 may be formed as part of one wafer-level procedure (e.g., a wafer-level procedure that can be used to obtain differently shaped and/or sized lens elements) or two separate wafer-level procedures. The lens elements 340 and 345 form a doublet. Each of the lens elements 335, 340, and 345 (e.g., and other optical components not labeled or shown in FIG. 3) may have specific optical characteristics, such as a specific effective focal length (EFL) and a transmitted wavefront. In general, each additional lens element provided may allow more degrees of freedom with regard to characteristics (e.g., shape such as curvature, size) defined for each of the lens elements to achieve a desired performance. Examples of materials of the lens elements 335, 340, and/or 345 may include $As_{40}Se_{60}$, $Ge_{22}As_{20}Se_{58}$, $Ge_{33}As_{12}Se_5$, germanium, zinc selenide, silicon, polyethylene, and TPX. In some cases, one or more coatings may be disposed on the lens elements 335, 340, and/or 345. By way of non-limiting examples, a coating may be an anti-reflective (AR) coating, a polarization coating, impact-resistant coating, and/or other coating.

The lens elements 335, 340, and 345 may coordinate to direct and focus infrared light onto the detector array 320. The lens element 335 receives the electromagnetic radiation and directs the received electromagnetic radiation to the lens element 340 of the rear lens group 310. The lens element 340 receives the electromagnetic radiation from the lens element 335 and directs the electromagnetic radiation received from the lens element 335 to the lens element 345. The lens element 345 receives the electromagnetic radiation from the lens element 340 and directs the electromagnetic radiation received from the lens element 340 to the detector array 320. As such, the front lens group 305 and the rear lens group 310 collectively project the scene onto the detector array 320. In this regard, FIG. 3 illustrates at least a portion of a scene ray traced through the front lens group 305 and the rear lens group 310 to the detector array 320. As shown in FIG. 3, the lens element 335 may be a refractive lens element. The lens elements 340 and 345 may be plano-convex lens elements. The lens element 335 has a surface A and a surface B opposite the surface A. The surface A of the lens element 335 faces the scene. The lens element 340 has a surface D and a surface E opposite the surface D. The surface D of the lens element 340 faces the surface B of the lens element 335. The lens element 345 has a surface I and a surface J opposite the surface I. The surface I of the lens element 345 faces the surface E of the lens element 340. The surface J of the lens element 340 faces the window 315.

As a non-limiting example, a distance between the surface B of the lens element 335 and the surface D of the lens element 340 may be between around 4 mm and around 5 mm. As a non-limiting example, a thickness of each of the lens elements 340 and 345 may be between around 0.5 mm and around 1.5 mm. The thickness of the lens elements 340 and 345 is generally selected for lower mass (e.g., associated with lower costs) while providing sufficient mechanical stability. As a non-limiting example, a size L (e.g., extending from around a bottom surface to a top surface of the lens element 335) may be from around 7 mm to around 500 mm. As a non-limiting example, a size H (e.g., extending from around the surface A of the lens element 335 to the surface J of the lens element 345) may be from around 5 mm to 300 mm. The dimensions of H and L generally depend on an image diagonal of the detector array 320. For a given pixel size, a larger pixel count is generally associated with a larger lens. As one example, L may be referred to as a length of an imaging device (e.g., a camera) and H may be referred to as a height of the imaging device, or vice versa L may be referred to as the height and H may be referred to as the length. As a non-limiting example, a thickness of the window 315 may be from around 0.4 mm to around 1 mm. As a non-limiting example, a gap between the window 315 and the detector array 310 may be around 0.1 mm.

The window 315 is disposed in front of the detector array 320 to selectively pass electromagnetic radiation to the detector array 320. Physical properties (e.g., material composition, thickness and/or other dimensions, etc.) of the window 315 may be determined based on a waveband(s) desired to be transmitted through the window 315. The window 315 may be provided as a lid for the detector array 320. The window 315 may be provided to protect the detector array 320 and form a vacuum between sensors (e.g., microbolometers) of the detector array 320 and the window 315. In some cases, the window 315 may be used to provide filtering, polarization, and/or other optical effects in addition to protection. In some cases, one or more coatings (e.g., polarization coating, AR coating, impact-resistant coating) may be disposed on the window 315 to provide the filtering, polarization, protection, and/or other effects.

The detector array 320 receives the electromagnetic radiation and generates an image based on the electromagnetic radiation. In an aspect, the image may be processed using processing circuitry downstream of the detector array 320. As non-limiting examples, the detector array 320 may have a size of 160×120 sensors (e.g., 160×120 array of microbolometers), 320×256 sensors, and 1280×1024 sensors.

Although, in the optical system 300, the front lens group 305 has a single lens and the rear lens group 310 has two lens elements, in some embodiments, the front lens group 305 has more than one lens element and/or the rear lens group 310 has more or fewer than two lens elements. As one example, providing more lens elements (e.g., one or more additional spherical lens elements) in the front lens group 305 may facilitate broadening of the FOV associated with the front lens group 305. In this regard, each additional lens element may facilitate broadening of the FOV associated with the front lens group 305. As one example, alternative or in addition to providing more lens elements in the front lens group 305, providing more lens elements (e.g., one or more additional aspherical lens elements) in the rear lens group 310 may allow projection of the electromagnetic radiation onto a larger detector array (e.g., having more rows and/or more columns of sensors).

The shutter component 325 may be operated to selectively inserted into an optical path between the scene and the rear lens group 310 to expose or block the scene from the detector array 320. In some cases, the shutter component 325 may be moved (e.g., slid, rotated, etc.) manually (e.g., by a user) and/or via an actuator (e.g., controllable by a logic device in response to user input or autonomously, such as an autonomous decision by the logic device to perform a calibration of an imaging device). In some aspects, the shutter component 325 may block the detector array 320 from the scene during a calibration process, in which the shutter component 325 may be used as a uniform blackbody (e.g., a substantially uniform blackbody), as further described herein.

An aperture stop 350 is positioned/defined in front of the rear lens group 310. The aperture stop 350 defines an amount of light that is transmitted to the detector array 320. The aperture stop 350 may have spatial dimensions comparable to spatial dimensions of the rear lens group 310. The aperture stop 350 may be defined by physical properties of the lens element 340, such as a size, shape, and material of the front surface of the lens element 340, and physical properties of a structure that holds the lens element 340. For instance, the structure may be a part of a lens barrel (e.g., the lens barrel 200). In one case, the structure may be a metal structure at least partially in front of the lens element 340. As one example, the structure may be a metal structure that has a shape that conforms to the front surface of the lens element 340.

In an embodiment, to facilitate alignment of a horizontal field of view with the horizontal direction of the detector array 320 and a vertical field of view with the vertical direction of the detector array 320, the lens elements 335, 340, and/or 345 can be moved relative to the detector array 320. In some aspects, the lens elements 335, 340, and/or 345 may be moved via sliding motion (e.g., translational motion) to facilitate focusing, such as by using one or more actuators coupled to the lens elements 335, 340, and/or 345. In one case, the sliding motion may be along the Z-axis (e.g., the direction perpendicular to a focal plane) while preserving a fixed angular orientation. In these aspects, a focusing mechanism of the lens elements 335, 340, and/or 345 may include components (e.g., actuators) for moving the lens elements 335, 340, and/or 345. In some aspects, one or more lenses may be focused by rotating the lens(es) inside a threaded housing. In some aspects, the housing is not threaded. The housing may allow a linear slip-fit type arrangement rather than a threaded-in type arrangement, in which the lens elements 335, 340, and/or 345 may be pushed into the housing and maintained in place using at least friction. Alternatively, some gap may be provided between the barrel and housing to allow for active alignment of the optics to the detector array 320 which is fixed in place by epoxy or other suitable adhesive.

In some embodiments, the lens elements 335, 340, and 345 are each associated with a lens prescription. In some aspects, each prescription may be expressed according to the following:

$$Z = \frac{cS^2}{1+\sqrt{1-(K+1)c^2S^2}} + A_1S^4 + A_2S^6 + A_3S^8 + A_4S^{10} + \ldots + A_{12}S^{26}$$

where $S=x^2+y^2$; $c=1/r$; $r$ is the radius of curvature; $A_1, A_2, A_3, A_4, \ldots, A_{12}$ are aspheric deformation constants; and $K$ is the conic constant.

Table 1 illustrates example values of various parameters of the optical system 300. For example, as shown in Table 1 below, the surface E of the lens element 340 and the surface J of the lens element 345 are flat surfaces and thus have zero coefficients.

| Coefficient | Surface A | Surface B | Surface E | Surface F | Surface I | Surface J |
|---|---|---|---|---|---|---|
| c | 0.0715839 | 0.1797383 | 0 | −0.192847 | 0.2789283 | 0 |
| k | 0 | 0 | 0 | 0 | 0 | 0 |
| $A_1$ | 0 | 0 | 0 | −1.082E−03 | −9.136E−03 | 0 |
| $A_2$ | 0 | 0 | 0 | 0 | 0 | 0 |
| $A_3$ | 0 | 0 | 0 | 0 | 0 | 0 |
| $A_4$ | 0 | 0 | 0 | 0 | 0 | 0 |
| $A_5$ | 0 | 0 | 0 | 0 | 0 | 0 |
| $A_6$ | 0 | 0 | 0 | 0 | 0 | 0 |
| $A_7$ | 0 | 0 | 0 | 0 | 0 | 0 |

Figure 4:
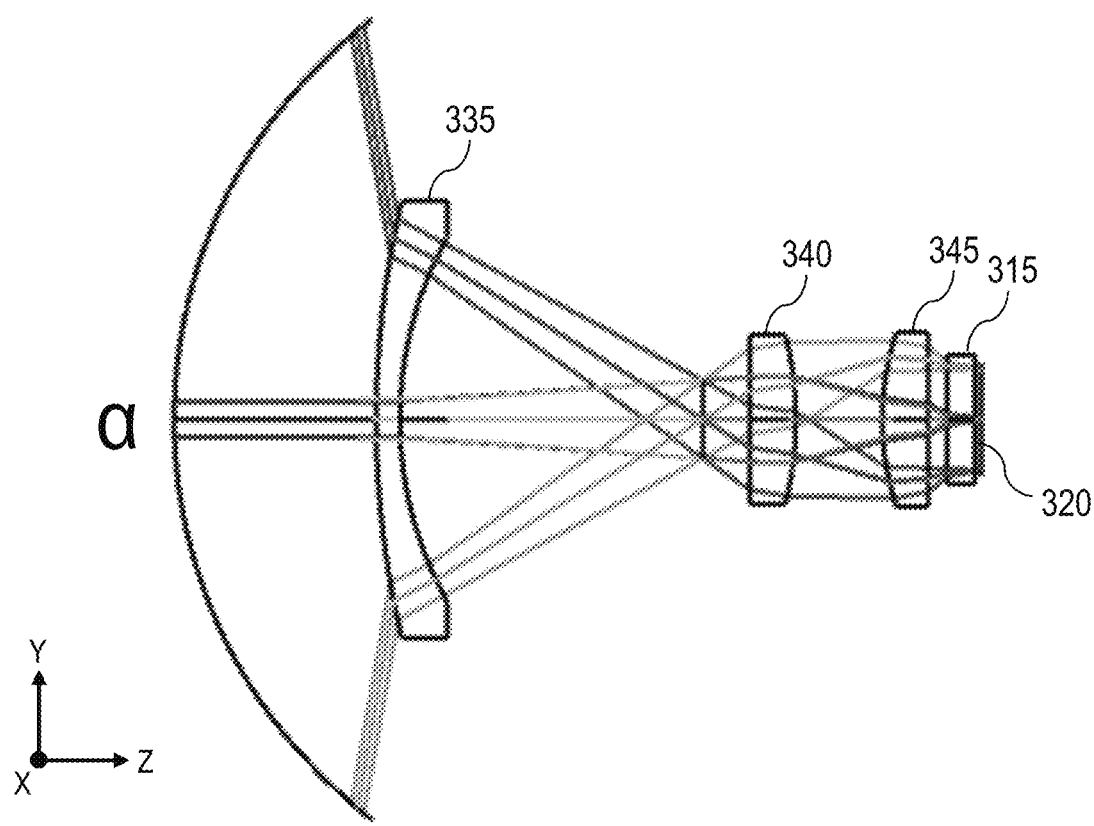
FIG. 4 illustrates a field of view associated with the optical system of FIG. 3 in accordance with one or more embodiments of the present disclosure.

FIG. 4 illustrates an FOV, denoted as α, associated with (e.g., provided by) the optical system 300 of FIG. 3 in accordance with one or more embodiments of the present disclosure. The FOV α depicted in FIG. 4 is around 160°. More generally, in some embodiments, the FOV α may be between around 110° to around 220°. In this regard, in some embodiments, the optical system 300 may be designed to provide a field of view α that exceeds 180° to allow an imaging device including the optical system 300 to capture scene data (e.g., image data in the form of electromagnetic radiation) behind the imaging device. In some aspects, the field of view α may be between around 120° to around 160°.

Figure 5:
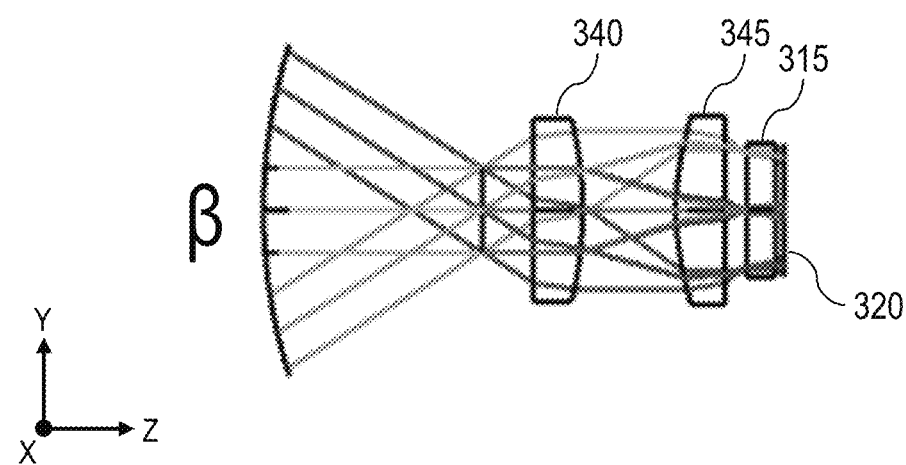
FIG. 5 illustrates a field of view associated with a rear lens group of the optical system of FIG. 3 in accordance with one or more embodiments of the present disclosure.

FIG. 5 illustrates a field of view, denoted as β, associated with the rear lens group 310 of the optical system 300 of FIG. 3. The FOV β depicted in FIG. 5 is around 60°. In some embodiments, the FOV β may be between around 50° to around 70°.

Figure 6:
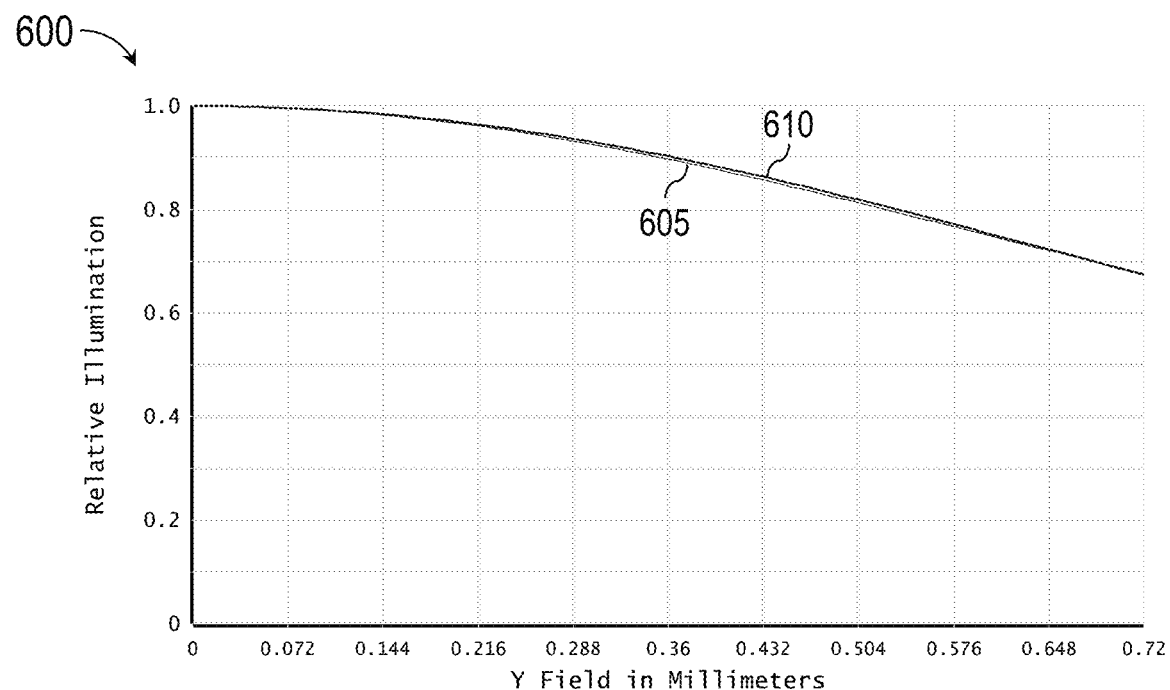
FIG. 6 illustrates a graph with a relative illumination curve associated with a lens system including a front lens group and a rear lens group and a relative illumination curve associated with just the rear lens group in accordance with one or more embodiments of the present disclosure.

In some embodiments, a gain calibration process may be performed on the optical system 300. In some aspects, the gain calibration process may involve using an imaging device to capture images of a flat uniform blackbody to create a gain map that is stored in a pipeline. To make a signal flat across an entire detector array, a signal drop due to relative illumination is compensated with gain. RI refers to an effect in which a lens element has illumination roll-off from the center towards the corner field. When the lens element 335 (e.g., and any other lens element of the front lens group 305) is a spherical lens element, a calibration process, such as a gain calibration process, may be performed based on just the rear lens group 310 (e.g., rather than the rear lens group 310 together with the front lens group 305). In such embodiments, due to the spherical shape of the lens element 335, the RI curve associated with the optical system 300 including the lens element 335 and the rear lens group 310 is substantially the same as an RI curve associated with only the rear lens group 310. As an example, FIG. 6 illustrates a graph 600 with an RI curve 605 associated with a lens system including the lens element 335 and the rear lens group 310 and an RI curve 610 associated with just the rear lens group 310. The RI curves 605 and 610 are substantially identical (e.g., substantially overlap/overlay each other).

A gain map may be determined based at least in part on the RI curve determined using just the rear lens group 310. In this regard, the front lens group 305 may be positioned in front of the rear lens group 310 after calibration of the rear lens group 310 without altering the gain map determined from the calibration. Thus, since the lens element 335 does not alter the RI curve, the gain calibration may be performed using just the rear lens group 310 rather than the rear lens group 310 together with the lens element 335. Using just the rear lens group 310 allows for a calibration setup that is generally easier to implement, since a calibration setup for a wide FOV lens element such as the lens element 335 involves capturing images of a correspondingly large blackbody (e.g., large flat uniform blackbody) that subtends the entire FOV produced by the wide FOV lens element. The calibration setup associated with using just the rear lens group 310 (e.g., as shown in FIG. 4) involves capturing images of a smaller blackbody that subtends the smaller FOV produced by the rear lens group 310 (e.g., compared to FOV produced by the rear lens group 310 together with the lens element 335). In some cases, use of a smaller blackbody allows for cost effective batch-level calibration.

The calibration setup may include a reference object (e.g., also referred to as a reference source) positioned in the field of view of the detector array 320. The reference object may be at a known temperature (e.g., accurately measured and/or controllable temperature) and provide a uniform blackbody. In this regard, the reference object may be used as a single temperature source or substantially single temperature source. In some cases, the reference object may be the shutter component 325 (e.g., an integrated shutter) that is selectively closed to block the detector array 320. A logic device may control an actuator to close the shutter component 325 or the user may manually close the shutter component 325 (e.g., by manually controlling the actuator or manually closing the shutter component 325). In some cases, the reference source may be an external reference object provided in the scene. Such an external object may be referred to as, or referred to as providing, an external shutter.

Although the foregoing describes performing the gain calibration process using just the rear lens group 310 and then installing the front lens group 305, in other embodiments, appropriate equipment, environment, and/or image device design may be readily available such that a gain calibration process may be performed on the rear lens group 310 together with the front lens group 305.

Figure 7A:
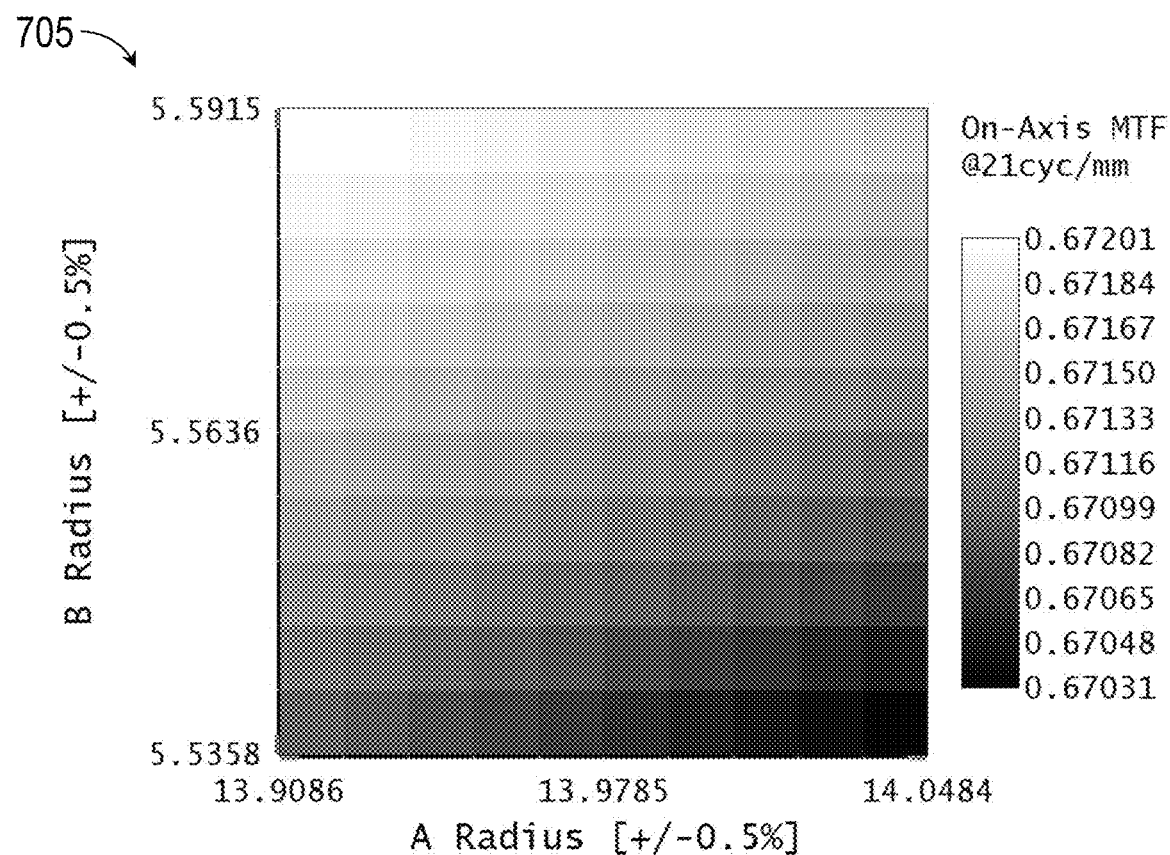
FIG. 7A illustrates a graph showing a modulation transfer function in relation to radii associated with surfaces of a lens element in accordance with one or more embodiments of the present disclosure.
Figure 7B:
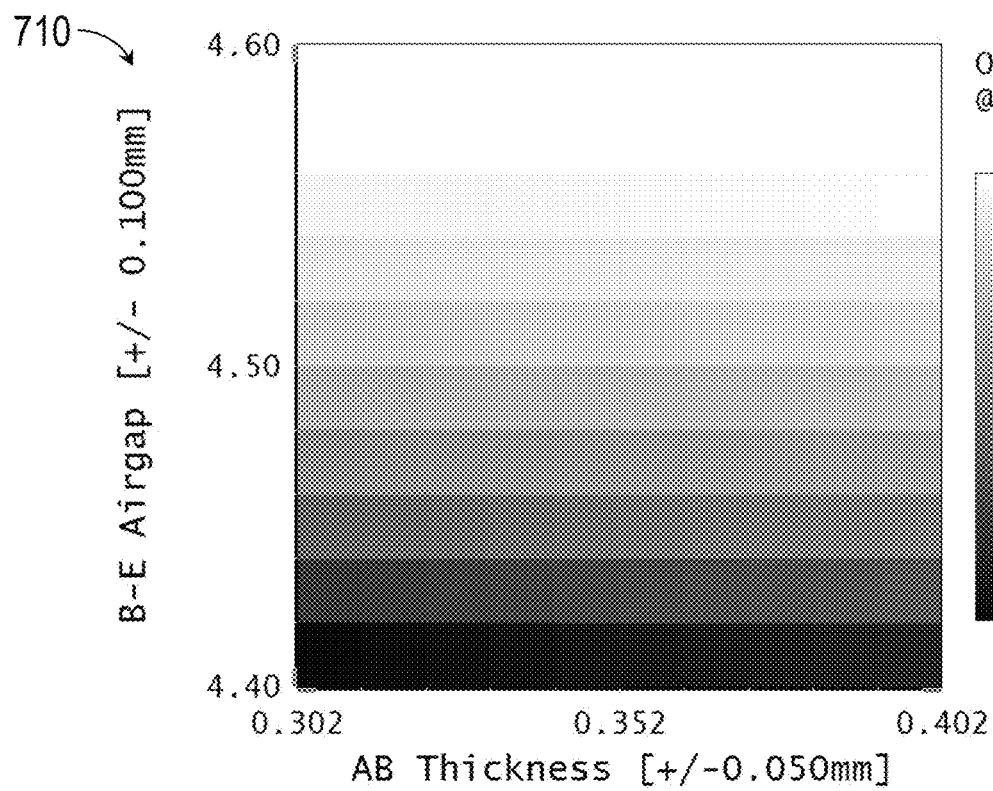
FIG. 7B illustrates a graph showing a modulation transfer function in relation to a thickness of a lens element and a distance between two groups of lenses in accordance with one or more embodiments of the present disclosure.
Figure 7C:
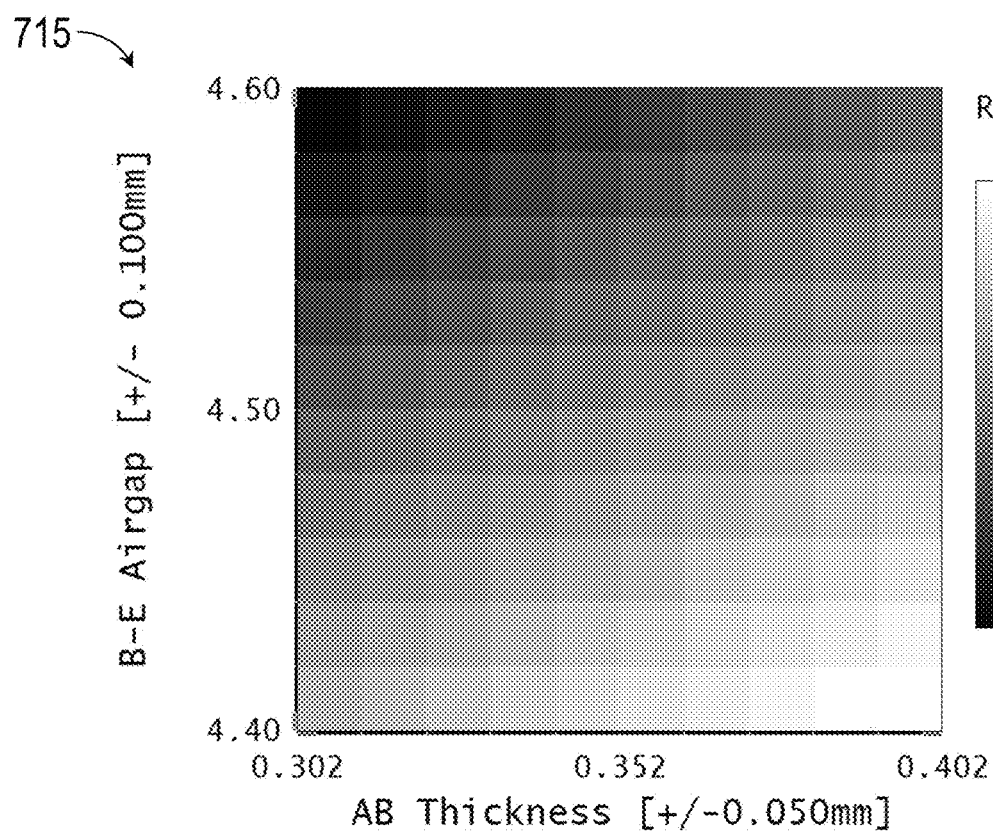
FIG. 7C illustrates a graph showing a relative illumination in relation to a thickness of a lens element and a distance between two groups of lenses in accordance with one or more embodiments of the present disclosure.
Figure 7D:
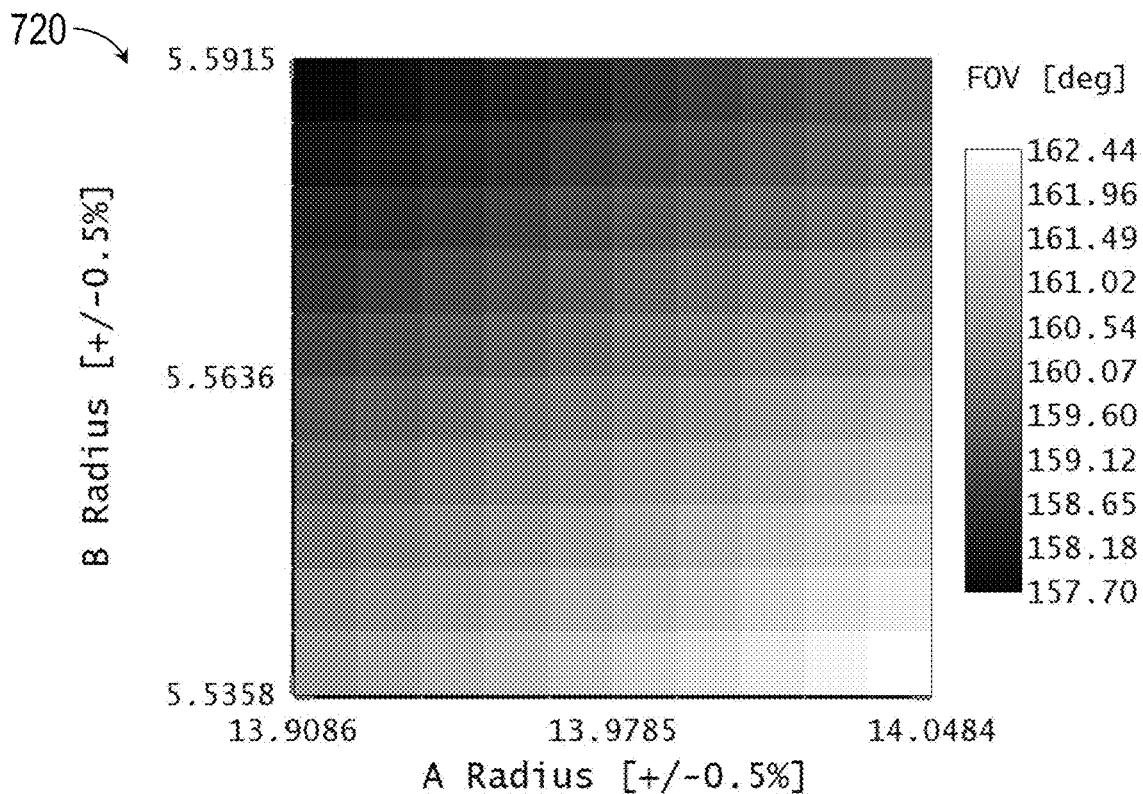
FIG. 7D illustrates a graph showing a field of view in relation to radii associated with surfaces of a lens element in accordance with one or more embodiments of the present disclosure.
Figure 7E:
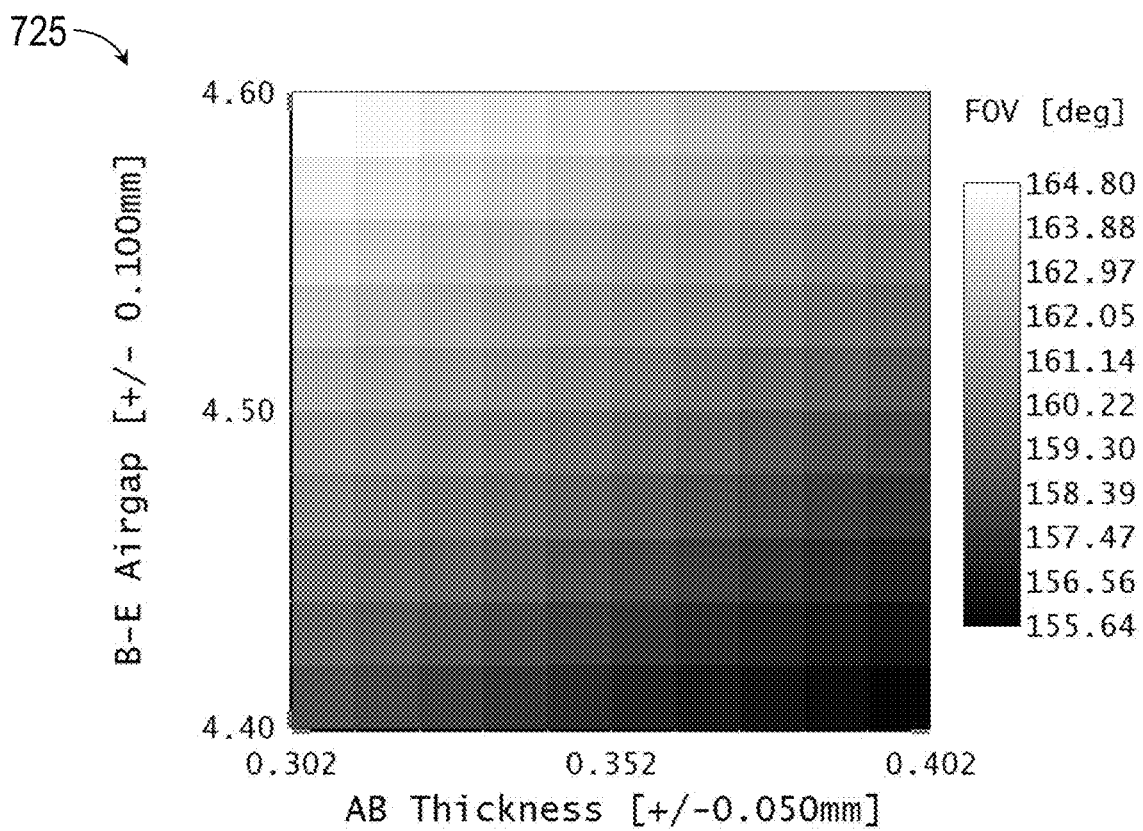
FIG. 7E illustrates a graph showing a field of view in relation to a thickness of a lens element and a distance between two groups of lenses in accordance with one or more embodiments of the present disclosure.
Figure 7F:
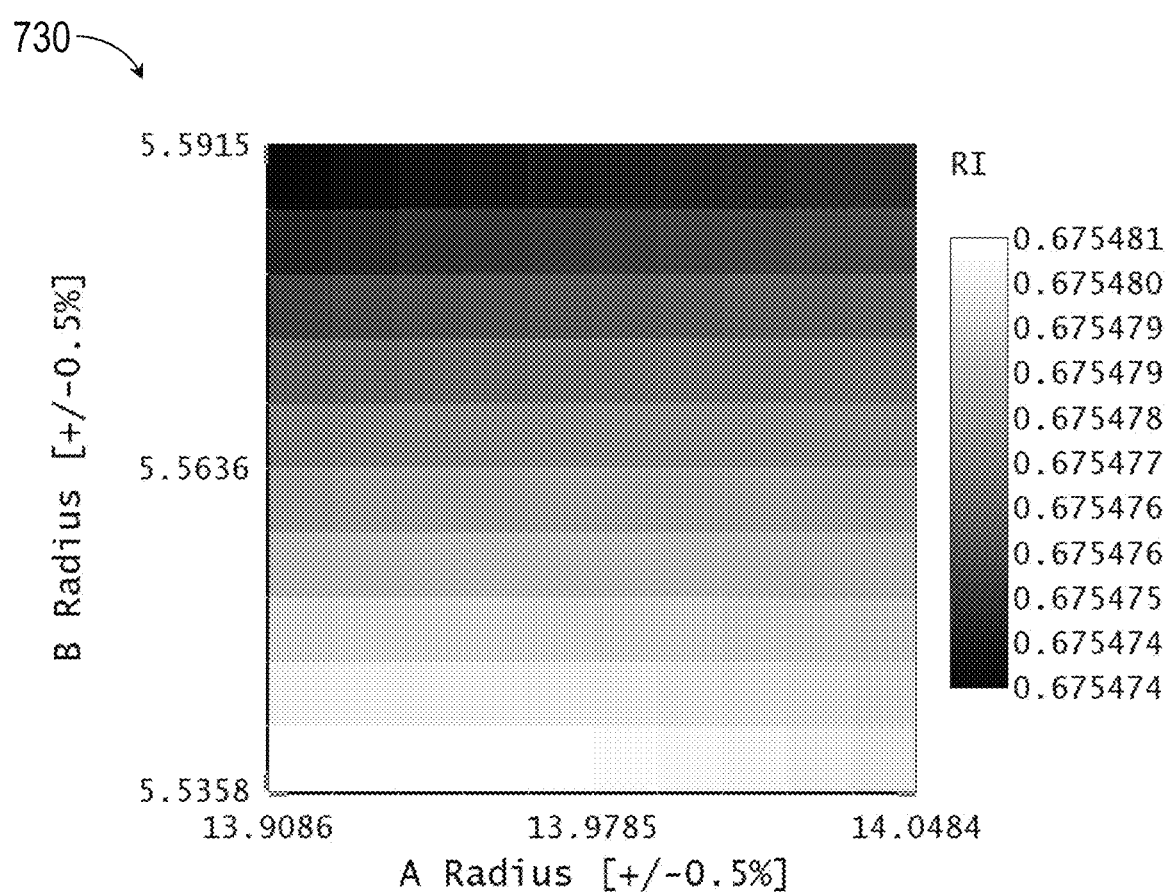
FIG. 7F illustrates a graph showing a relative illumination in relation to radii associated with surfaces of a lens element in accordance with one or more embodiments of the present disclosure.

In some embodiments, use of a spherical prescription for a front lens element(s) of the front lens group 305 may allow for low sensitivity of lens performance to figure errors in the prescription(s) of the front lens element(s) and its/their respective position relative to rear lens elements of the rear lens group 310. As an example, FIGS. 7A through 7F each illustrates a graph showing a low sensitivity of a performance metric (e.g., modulation transfer function, FOV, or RI) to figure errors and position of the lens element 335 (e.g., relative to the rear lens group 310). For explanatory purposes, the lens element 335 has the prescription provided in Table 1. FIG. 7A illustrates a graph 705 showing a low sensitivity of an on-axis modulation transfer function (MTF) in relation to a radius (e.g., in mm) associated with the surface A, denoted as A radius, and a radius (e.g., in mm) associated with the surface B, denoted as B radius. FIG. 7B illustrates a graph 710 showing a low sensitivity of the on-axis MTF in relation to a thickness of the lens element 335, denoted as AB thickness (e.g., a distance between the surface A and surface B), and a distance between the surface B of the lens element 335 and the surface E of the lens element 340, denoted as B-E airgap. FIG. 7C illustrates a graph 715 showing a low sensitivity of the RI in relation to the AB thickness and the B-E airgap. FIG. 7D illustrates a graph 720 showing a low sensitivity of the FOV in relation to the A radius and the B radius. FIG. 7E illustrates a graph 725 showing a low sensitivity of the FOV in relation to the AB thickness and the B-E airgap. FIG. 7F illustrates a graph 730 showing a low sensitivity of the RI in relation to the A radius and the B radius. In some embodiments, such low sensitivity may be leveraged to allow focusing of a lens system including the front lens group 305 and the rear lens group 310 using automated focusing equipment (e.g., cost effective automated focusing equipment) as part of manufacturing of an imaging device that includes the lens system.

Figure 8:
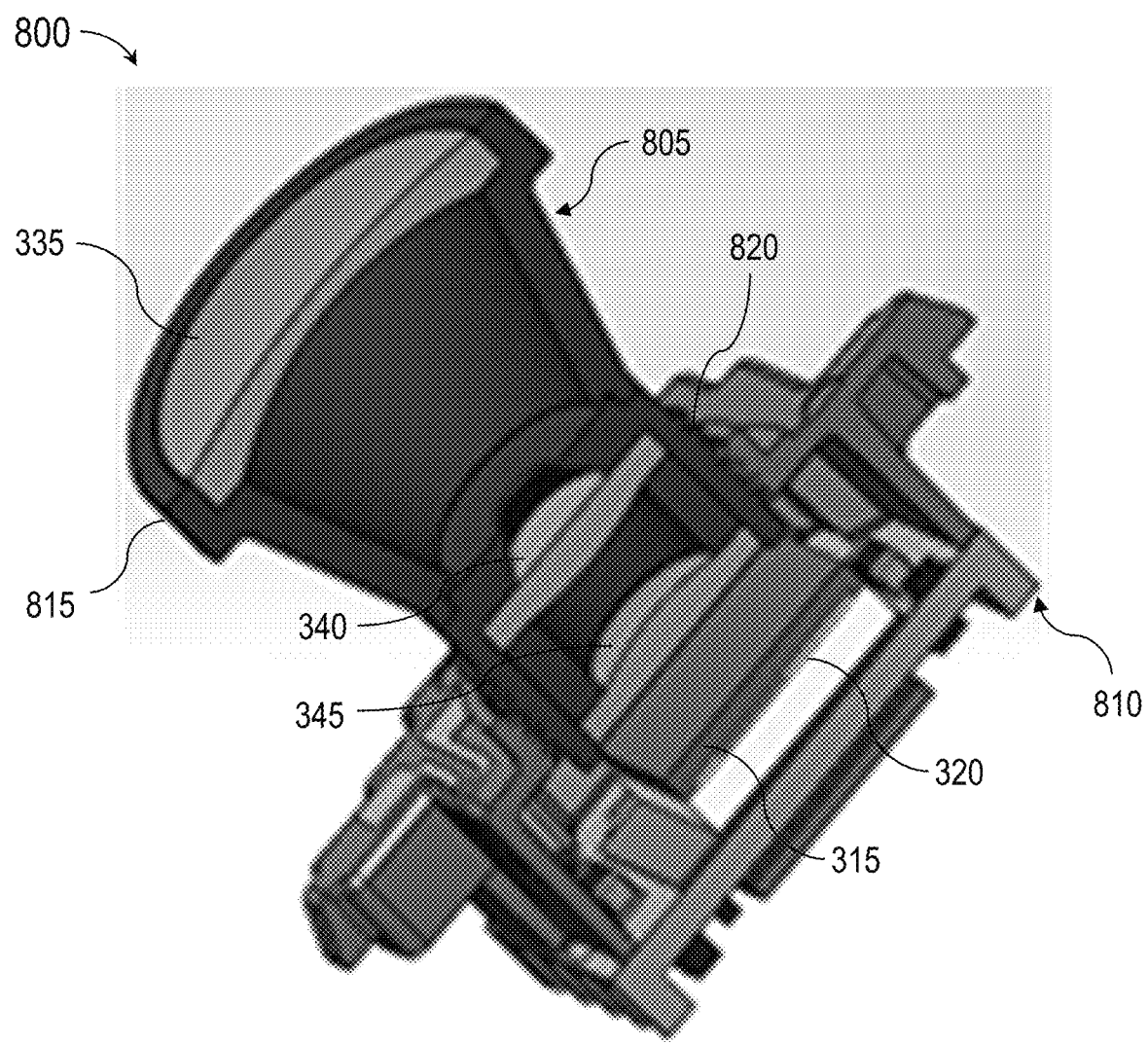
FIG. 8 illustrates a cross-sectional view of an imaging device in accordance with one or more embodiments of the present disclosure.

FIG. 8 illustrates a cross-sectional view of an imaging device 800 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging device 800 includes a lens barrel 805, the window 315, and the detector array 320. The window 315 and the detector array 320 are disposed in a housing 810 (e.g., camera housing) of the imaging device 800. The lens barrel 805 includes body portions 815 and 820. The lens barrel 805 (e.g., the body portions 815 and/or 820) includes a structure(s) to hold/secure (e.g., fixedly secure, movably secure) optical elements, such as lens elements. The body portion 815 may be referred to as a front body portion or a top body portion, and the body portion 820 may be referred to as a rear body portion or a bottom body portion. The body portion 815 and the body portion 820 may be formed as separate pieces that are then coupled together (e.g., using adhesives, engagement features, etc.). In FIG. 8, the body portion 815 includes the lens element 335 of the front lens group 305, and the body portion 820 includes the lens elements 340 and 345 of the rear lens group 310. The lens barrel 805 may allow optical components disposed therein to maintain axial position and/or air gap between them. In some cases, a portion (e.g., a portion of the body portion 820) of the lens barrel 805 may be threaded to mate with a threaded portion of the housing 810. Such threading may facilitate focusing of the optical elements relative to a focal plane array.

Figure 9:
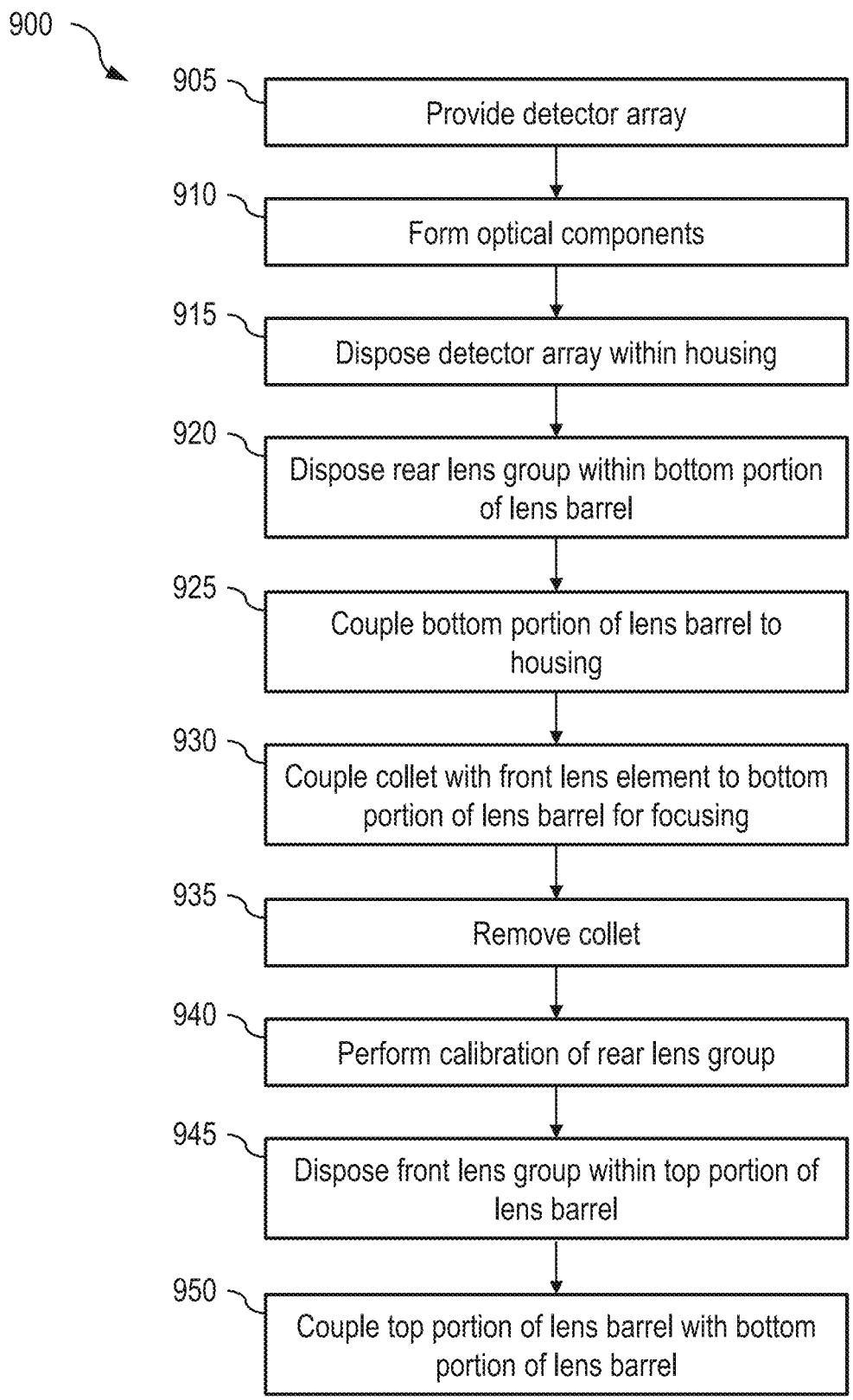
FIG. 9 illustrates a flow diagram of an example process for manufacturing the imaging device of FIG. 8 in accordance with one or more embodiments of the disclosure.

FIG. 9 illustrates a flow diagram of an example process 900 for manufacturing the imaging device 800 of FIG. 8 in accordance with one or more embodiments of the disclosure. For explanatory purposes, the example process 900 is described herein with reference to components of FIGS. 8, 10A, 10B, 10C, and 10D. FIGS. 10A, 10B, 10C, and 10D illustrate perspective views associated with manufacturing the imaging device 800. However, the example process 900 is not limited to the components of FIGS. 8, 10A, 10B, 10C, and 10D.

At block 905, the detector array 320 is provided. At block 910, optical components are formed. The optical components may include one or more windows (e.g., the window 315) and/or one or more lens elements (e.g., the lens elements 335, 340, and 345). In some cases, the lens element 335 may be a spherical lens element (e.g., spherical surface on both sides) formed using grinding/polishing processes. In some cases, the lens elements 340 and 345 may be aspherical lens elements formed using WLO processes. For LWIR imaging applications, the window 315 and the lens element 335, 340, and 345 may be formed from material that is transmissive in the 7-14 µm wavebands.

At block 915, the detector array 320 is disposed within the housing 810 (e.g., camera housing) of the imaging device 800. The window 315 may be provided as a lid for the detector array 320. The window 315 may be provided to protect the detector array 320 and form a vacuum between sensors (e.g., microbolometers) of the detector array 320 and the window 315. In designing the optical system 300, a certain distance between the lens element 335 and the detector array 320 is allocated to support a certain thickness for the window 315. At block 920, with reference to FIG. 10A, the rear lens group 310 is at least partially disposed within the lens barrel 805 (e.g., the body portion 820 of the lens barrel 805). In some aspects, the lens elements 340 and 345 may each have mating features to couple to corresponding mating features of the lens barrel 805. At block 925, the body portion 820 of the lens barrel 805 is coupled to the housing 810.

Figure 10A:
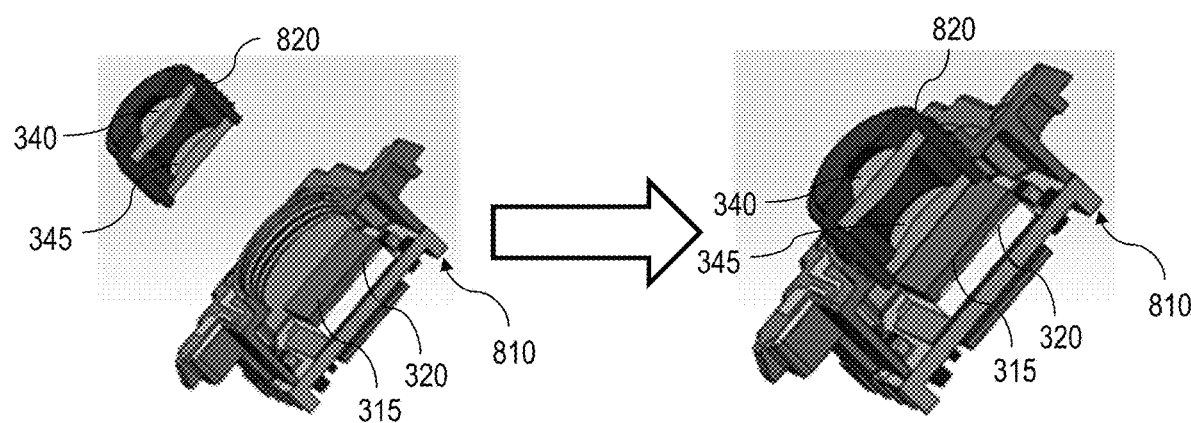
FIGS. 10A, 10B, 10C, and 10D illustrate perspective views associated with manufacturing the imaging device of FIG. 8 in accordance with one or more embodiments of the present disclosure.
Figure 10B:
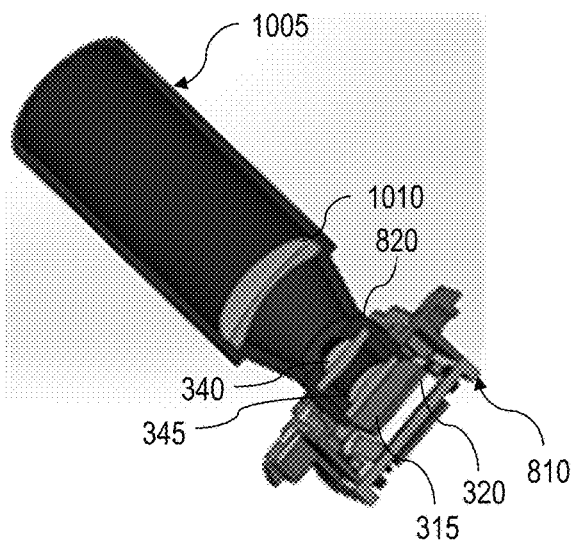

At block 930, with reference to FIG. 10B, a collet 1005 with a front lens element 1010 positioned therein is coupled/engaged to the body portion 820 of the lens barrel 805 to allow an accurate focusing of a three-lens system formed of the lens elements 340 and 345 and the front lens element 1010. As a result of a focusing process, the three-lens system is focused relative to the detector array 320. During focusing, the collet 1005 may be engaged with the body portion 820 of the lens barrel 805 using torque locking features (not shown) so that the three-lens system is focused relative to the detector array 320. The collet 1005 may provide a standard reference for facilitating focusing rear lens groups to the front lens element 1010. It is noted that disposing of the lenses 340 and 345 within the body portion 820 of the lens barrel 805 at block 920 need not be accurate. A position of the lens elements 340 and 345 may be determined/estimated based on an approximate number of threaded turns. More precise positioning of the lens elements 340 and 345 (e.g., relative to the front lens element 1010 and the detector array 320) may be performed at block 930.

Figure 10C:
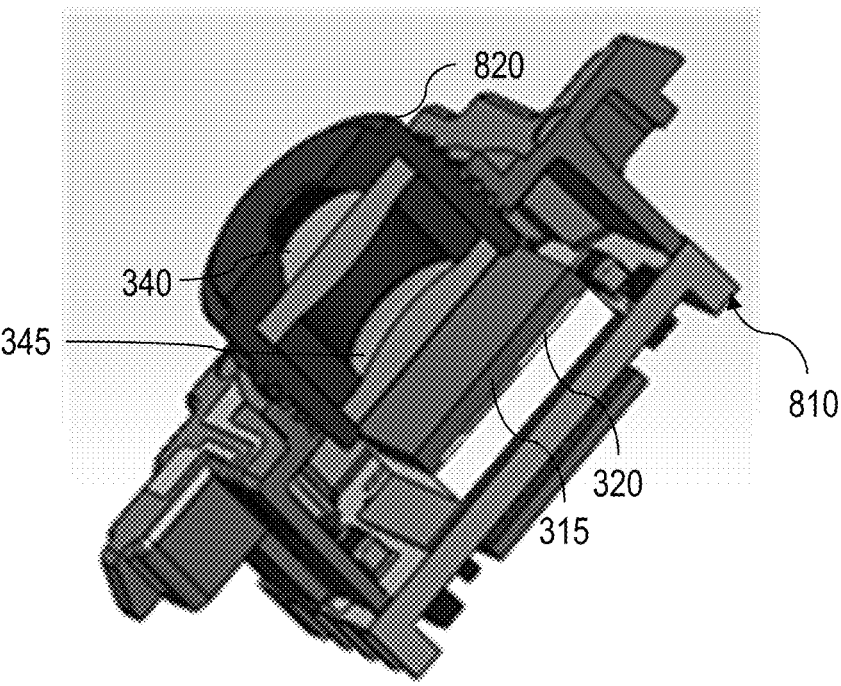
Figure 10D:
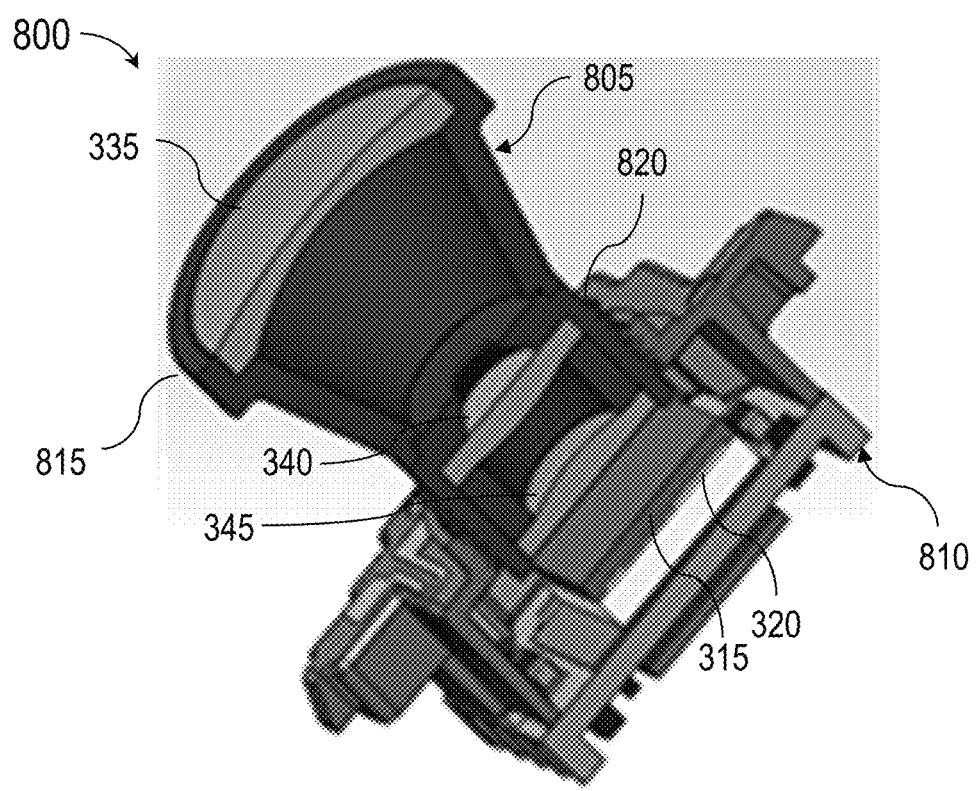

At block 935, with reference to FIG. 10C, the collet 1005 with the front lens element 1010 is removed (e.g., decoupled/disengaged from the body portion 820 of the lens barrel 805) after the focusing process. As a result of the focusing, the lens elements 340 and 345 of the rear lens group 310 are appropriately positioned (e.g., at a focusing back working distance) relative to the detector array 320. At block 940, a gain correction/calibration of the rear lens group 310 is performed with the rear lens group 310 positioned according to the focusing performed at block 930 to obtain a gain map. To perform the calibration, a reference object (e.g., internal shutter, external shutter, or other object) may be positioned on the FOV of the rear lens group 310 and image data captured by directing electromagnetic radiation to the detector array 320 using the rear lens group 310. The gain map may be determined (e.g., using a logic device of and/or coupled to the imaging device 800) based on the image data. Due to use of the front lens element 910 for facilitating focusing and calibration, the front lens element 910 may be referred to as a reference lens element or a calibration lens element.

At block 945, the front lens group 305 is at least partially disposed within the body portion 815 of the lens barrel 805. At block 950, with reference to FIG. 10D, the body portion 815 of the lens barrel 805 with the front lens group 305 disposed therein is coupled to the body portion 820 of the lens barrel 805. The imaging device 800 is formed and may be used to capture images. Gain correction may be performed on these images using the gain map determined at block 940 based on the rear lens group 310 (e.g., without the front lens group 305 installed). In some cases, the front lens group 305 may be focused slightly after installation before the imaging device 800 is used. In some aspects, due to a low sensitivity of the design to figure errors of a front lens element and its position, an impact of variations in geometrical errors in the population is generally minuscule (e.g., assuming the front lens elements are manufactured within appropriate tolerances). In some aspects, due to such low sensitivity, the lens element 335 of the front lens group 305 may be selected (e.g., randomly selected) from a population of lens elements manufactured according to a prescription associated with a desired front group lens element. In this regard, the rear lens group 310 may form a lens system with any lens elements manufactured according to a prescription associated with a desired front group lens element with minimal or no further adjustment needed before use of the lens system including the front group lens element and the rear lens group 310. Each lens element of the population may be produced by a vendor(s) within a certain margin of error. It is noted that the calibration at block 940 may be performed at the factory and/or in-thefield. In some cases, in-the-field calibration may be performed using the lens element 335 and without the collet 1005.

Figure 11:
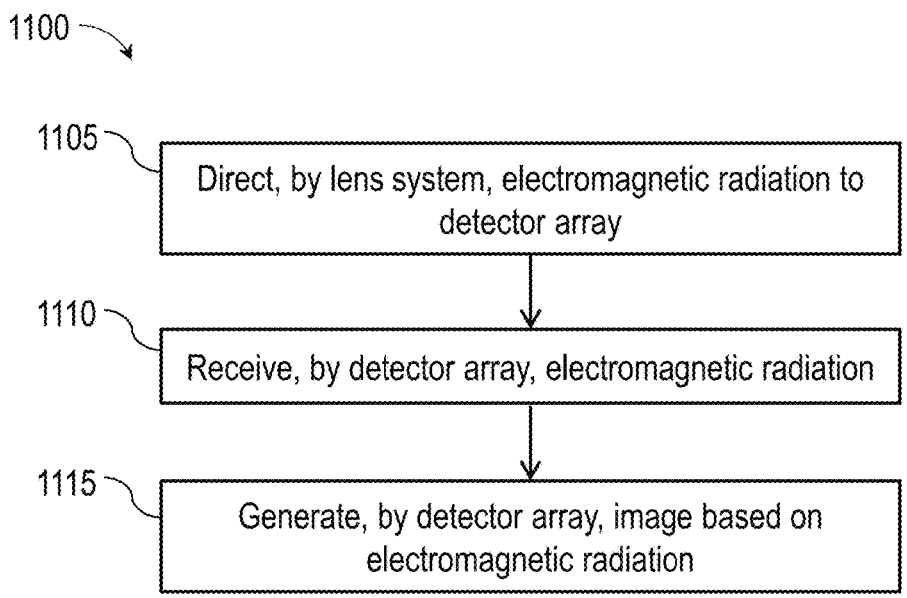
FIG. 11 illustrates a flow diagram of an example process for using the imaging device of FIG. 8 in accordance with one or more embodiments of the present disclosure.

FIG. 11 illustrates a flow diagram of an example process 1100 for using the imaging device 800 of FIG. 8 in accordance with one or more embodiments of the present disclosure. For explanatory purposes, the example process 1100 is primarily described herein with reference to the imaging device 800. However, the example process 1100 is not limited to the imaging device 800 of FIG. 8. At block 1105, a lens system including the front lens group 305 and the rear lens group 310 receives electromagnetic radiation associated with a scene and directs the electromagnetic radiation to the detector array 320. At block 1110, the detector array 320 receives the electromagnetic radiation from the lens system. In this regard, each detector of the detector array 320 may receive a portion of the electromagnetic radiation from the lens system. At block 1115, the detector array 320 generates an image based on the electromagnetic radiation and a gain map. In some aspects, the gain map may be determined (e.g., at block 940) based on a calibration of the rear lens group 310 (e.g., without the front lens group 305 installed). In some aspects, the lens system may be appropriate to transmit thermal infrared radiation and the image generated by the detector array 320 may be a thermal infrared image. In some cases, the image generated by the detector array 320 may be provided for processing, storage, and/or display. For example, the image may be provided to a processor for processing to remove distortion in the image, and the processed image may then be provided for storage, display, and/or further processing.

Although, in the optical system 300 referenced in FIG. 3 and various other figures, the front lens group 305 has a single lens and the rear lens group 310 has two lens elements, in some embodiments, the front lens group 305 has more than one lens element and/or the rear lens group 310 has more or fewer than two lens elements.

Figure 12:
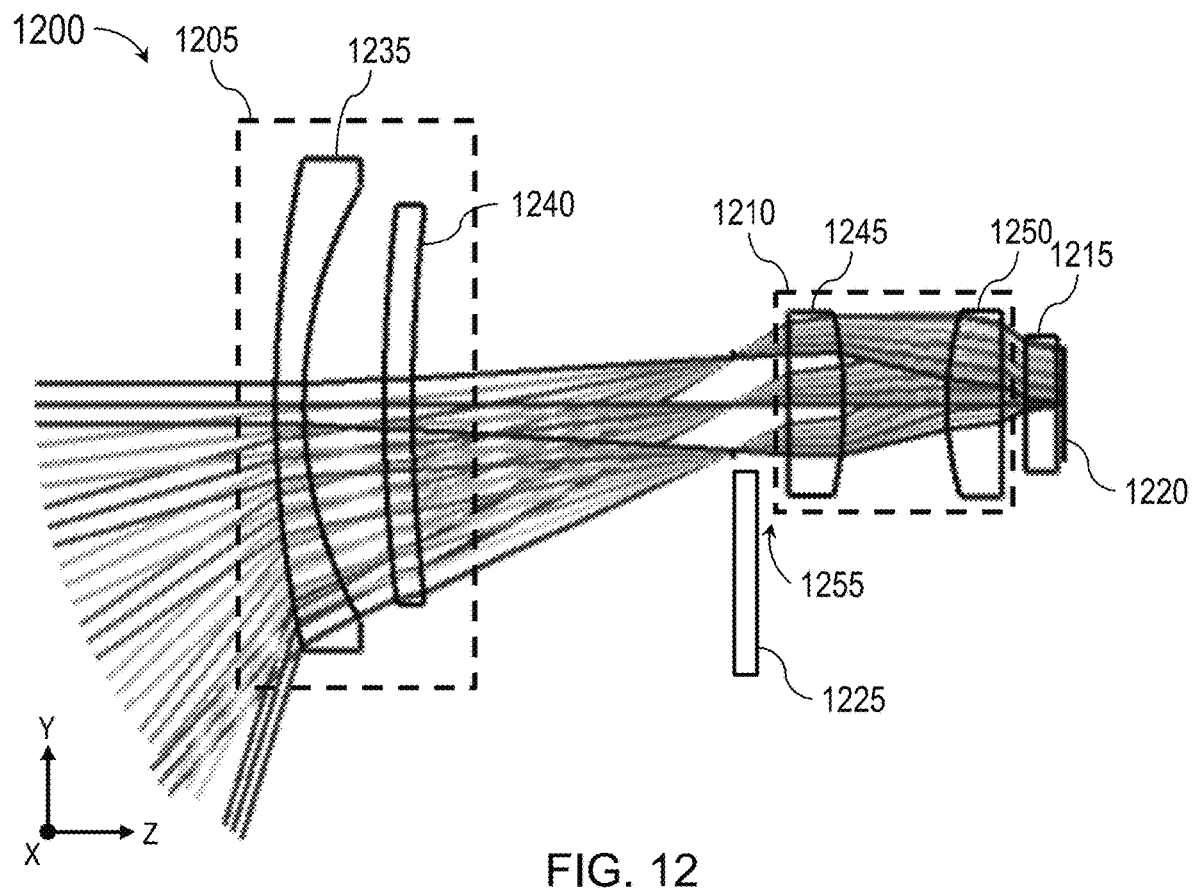
FIG. 12 illustrates a cross-sectional view of an optical system with two front lens elements in accordance with one or more embodiments of the present disclosure.

In an aspect, providing more lens elements (e.g., one or more additional spherical lens elements) in the front lens group 305 may facilitate broadening of the FOV associated with the front lens group 305. In this regard, each additional lens element may facilitate broadening of the FOV associated with the front lens group 305. As an example, FIG. 12 illustrates a cross-sectional view of an optical system 1200 in accordance with one or more embodiments of the present disclosure. The description of FIG. 3 generally applies to FIG. 12, with examples of differences and other description provided herein. The optical system 1200 includes a front lens group 1205, a rear lens group 1210, a window 1215, a detector array 1220, and a shutter component 1225. In an embodiment, the front lens group 1205, the rear group lens 1210, the window 1215, the detector array 1220, and the shutter component 1225 may be, may provide the same or similar functionality as, and/or may otherwise correspond to the front lens group 305, the rear group lens 310, the window 315, the detector array 320, and the shutter component 325, respectively.

The front lens group 1205 includes lens elements 1235 and 1240. The front lens group 1205 may provide a wide FOV, such as an UWFOV. In some aspects, the lens element 1235 and 1240 may spherical lens elements. The spherical lens elements may be formed by grinding/polishing processes. In some cases, both surfaces of the lens elements 1235 and 1240 may be spherical. Relative to the front lens group 305 of FIG. 3 that includes a single front lens element, the additional lens element 1240 may facilitate broadening of the FOV. The rear lens group 1210 includes lens elements 1245 and 1250. In some aspects, the lens elements 1245 and 1250 may be aspherical lens elements. The lens elements 1245 and 1250 may be formed by WLO processes. In an embodiment, the lens element 1235 may have the same or similar prescription/properties (e.g., material properties, applied coatings, etc.) as the lens element 335, the lens element 1245 may have the same or similar prescription/properties as the lens element 340, and/or the lens element 1250 may have the same or similar prescription/properties as the lens element 345.

The lens elements 1235, 1240, 1245, and 1250 may coordinate to direct and focus infrared light onto the detector array 1220. The lens element 1235 receives the electromagnetic radiation and directs the received electromagnetic radiation to the lens element 1240. The lens element 1240 receives the electromagnetic radiation from the lens element 1235 and directs the received electromagnetic radiation to the lens element 1245. The lens element 1245 receives the electromagnetic radiation from the lens element 1240 and directs the electromagnetic radiation received from the lens element 1240 to the lens element 1250. The lens element 1250 receives the electromagnetic radiation from the lens element 1245 and directs the electromagnetic radiation received from the lens element 1245 to the detector array 1220. As such, the front lens group 1205 and the rear lens group 1210 collectively project the scene onto the detector array 1220. In this regard, FIG. 12 illustrates at least a portion of a scene ray traced through the front lens group 1205 and the rear lens group 1210 to the detector array 1220. An aperture stop 1255 is positioned/defined in front of the rear lens group 1210. The aperture stop 1255 defines an amount of light that is transmitted to the detector array 1220. The aperture stop 1255 may have spatial dimensions comparable to spatial dimensions of the rear lens group 1210.

Figure 13:
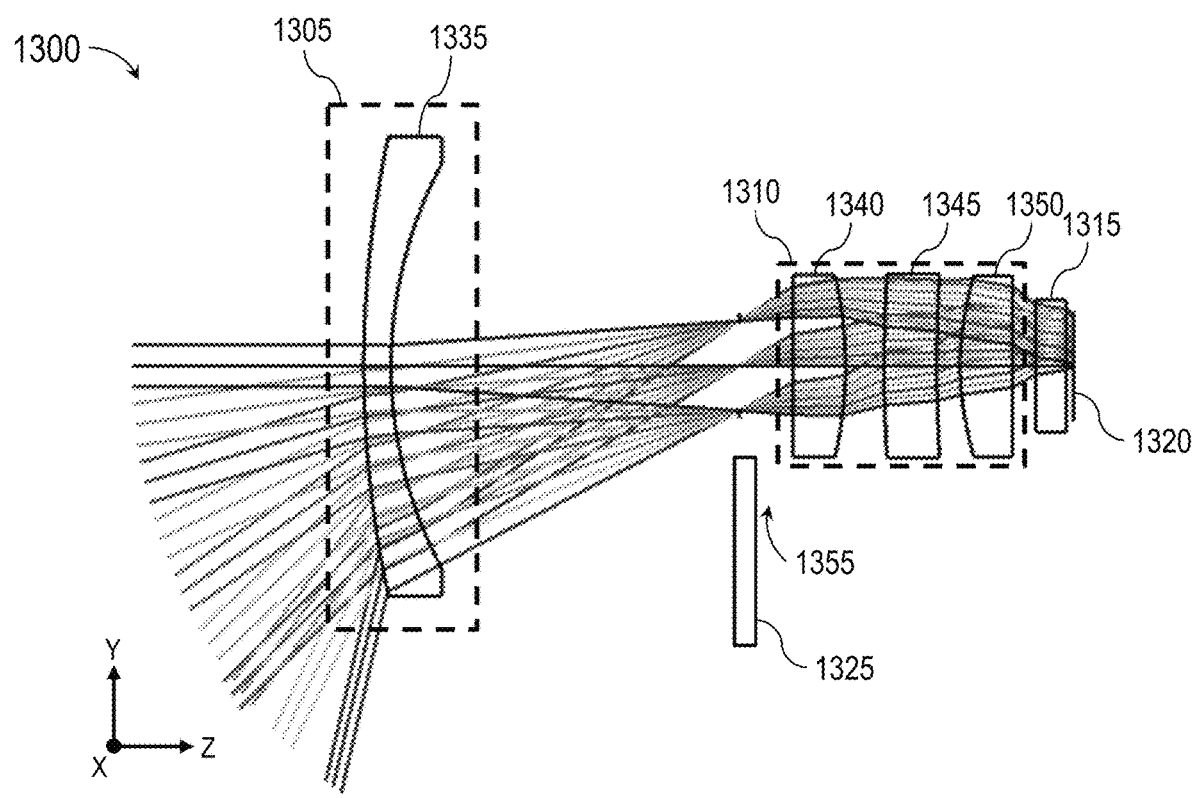
FIG. 13 illustrates a cross-sectional view of an optical system with three rear lens elements in accordance with one or more embodiments of the present disclosure.

In an aspect, alternative or in addition to providing more lens elements in the front lens group 305, more lens elements may be provided in the rear lens group 310. Providing more lens elements (e.g., one or more additional aspherical lens elements) in the rear lens group 310 may allow projection of the electromagnetic radiation onto a larger detector array (e.g., having more rows and/or more columns of sensors). As an example, FIG. 13 illustrates a cross-sectional view of an optical system 1300 in accordance with one or more embodiments of the present disclosure. The description of FIGS. 3 and 12 generally applies to FIG. 13, with examples of differences and other description provided herein. The optical system 1300 includes a front lens group 1305, a rear lens group 1310, a window 1315, a detector array 1320, and a shutter component 1325. In an embodiment, the front lens group 1305, the rear group lens 1310, the window 1315, the detector array 1320, and the shutter component 1325 may be, may provide the same or similar functionality as, and/or may otherwise correspond to the front lens group 305, the rear group lens 310, the window 315, the detector array 320, and the shutter component 325, respectively.

The front lens group 1305 includes a lens element 1335. The front lens group 1305 may provide a wide FOV, such as an UWFOV. In some aspects, the lens element 1335 may be a spherical lens element. The spherical lens element may be formed by grinding/polishing processes. In some cases, both surfaces of the lens element 1335 may be spherical. The rear lens group 1310 includes lens elements 1340, 1345, and 1350. In some aspects, the lens elements 1340, 1345, and 1350 may be aspherical lens elements. The lens elements 1340, 1345, and 1350 may be formed by WLO processes. Relative to the rear lens group 310 of FIG. 3 that includes two rear lens elements, the additional lens element 1345 may facilitate projection of the electromagnetic radiation onto a larger detector array. In an embodiment, the lens element 1335 may have the same or similar prescription/properties (e.g., material properties, applied coatings, etc.) as the lens element 335, the lens element 1340 may have the same or similar prescription/properties as the lens element 340, and/or the lens element 1350 may have the same or similar prescription/properties as the lens element 345.

The lens elements 1335, 1340, 1345, and 1350 may coordinate to direct and focus infrared light onto the detector array 1320. The lens element 1335 receives the electromagnetic radiation and directs the received electromagnetic radiation to the lens element 1340. The lens element 1340 receives the electromagnetic radiation from the lens element 1335 and directs the received electromagnetic radiation to the lens element 1345. The lens element 1345 receives the electromagnetic radiation from the lens element 1340 and directs the electromagnetic radiation received from the lens element 1340 to the lens element 1350. The lens element 1350 receives the electromagnetic radiation from the lens element 1345 and directs the electromagnetic radiation received from the lens element 1345 to the detector array 1320. As such, the front lens group 1305 and the rear lens group 1310 collectively project the scene onto the detector array 1320. In this regard, FIG. 13 illustrates at least a portion of a scene ray traced through the front lens group 1305 and the rear lens group 1310 to the detector array 1320. An aperture stop 1355 is positioned/defined in front of the rear lens group 1310. The aperture stop 1355 defines an amount of light that is transmitted to the detector array 1320. The aperture stop 1355 may have spatial dimensions comparable to spatial dimensions of the rear lens group 1310.

Figure 14:
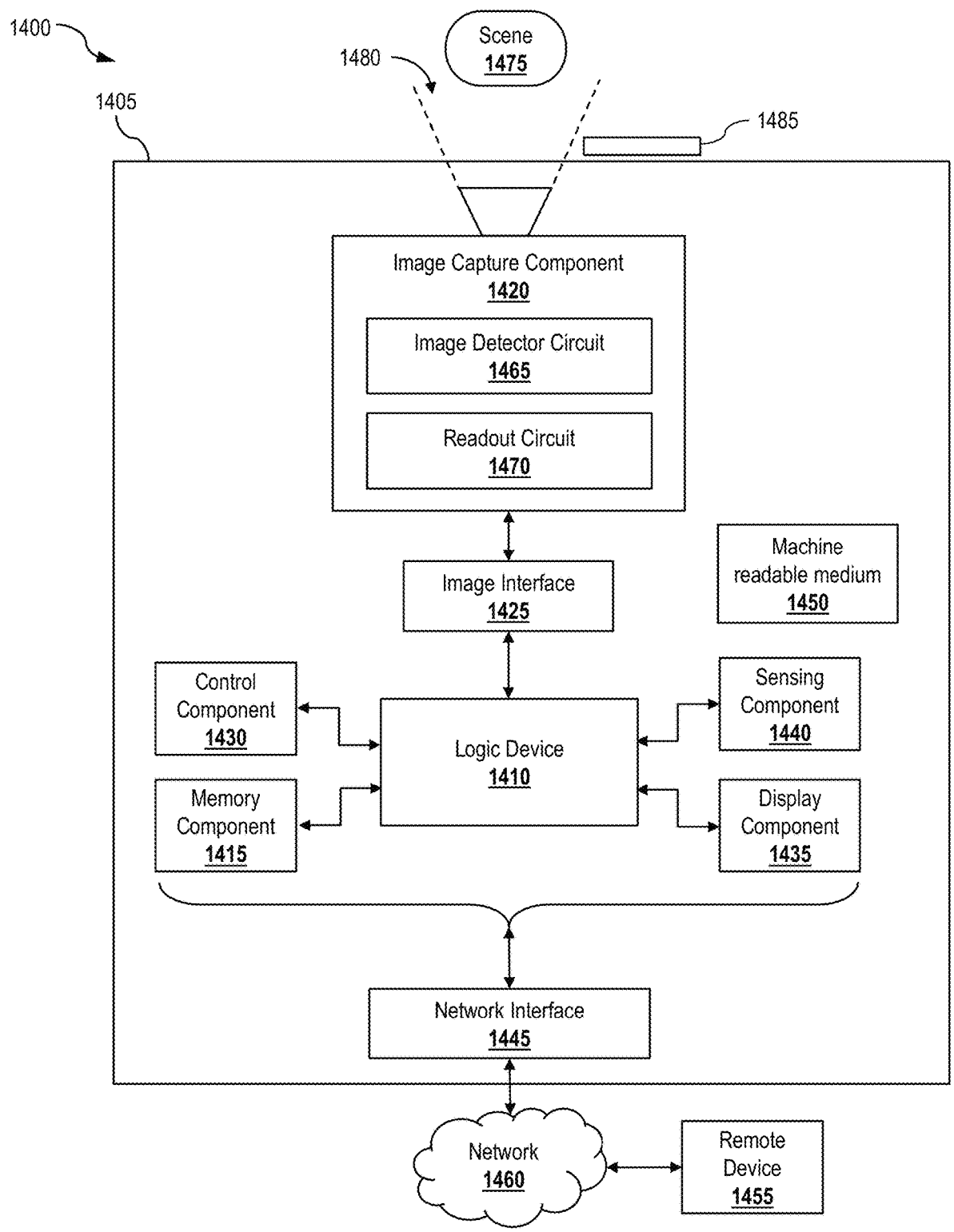
FIG. 14 illustrates a block diagram of an example imaging system in accordance with one or more embodiments of the present disclosure.

FIG. 14 illustrates a block diagram of an example imaging system 1400 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 1400 may be utilized for capturing and processing images in accordance with an embodiment of the disclosure. The imaging system 1400 may represent any type of imaging system that detects one or more ranges (e.g., wavebands) of EM radiation and provides representative data (e.g., one or more still image frames or video image frames). The imaging system 1400 may include an imaging device 1405. By way of non-limiting examples, the imaging device 1405 may be, may include, or may be a part of an infrared camera, a visible-light camera, a tablet computer, a laptop, a personal digital assistant (PDA), a mobile device, a desktop computer, or other electronic device. The imaging device 1405 may include a housing (e.g., a camera body) that at least partially encloses components of the imaging device 1405, such as to facilitate compactness and protection of the imaging device 1405. For example, the solid box labeled 1405 in FIG. 14 may represent a housing of the imaging device 1405. The housing may contain more, fewer, and/or different components of the imaging device 1405 than those depicted within the solid box in FIG. 14. In an embodiment, the imaging system 1400 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 1400. In another example, the imaging system 1400 may be coupled to various types of fixed locations (e.g., a home security mount, a campsite or outdoors mount, or other location) via one or more types of mounts.

The imaging device 1405 includes, according to one implementation, a logic device 1410, a memory component 1415, an image capture component 1420 (e.g., an imager, an image sensor device), an image interface 1425, a control component 1430, a display component 1435, a sensing component 1440, and/or a network interface 1445. In an embodiment, the imaging device 1405 may be, may include, or may be a part of, the imaging device 100 of FIG. 1 and/or the imaging device 800 of FIG. 8. The logic device 1410, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device, one or more memories for storing executable instructions (e.g., software, firmware, or other instructions), and/or or any other appropriate combination of processing device and/or memory to execute instructions to perform any of the various operations described herein. The logic device 1410 may be configured, by hardwiring, executing software instructions, or a combination of both, to perform various operations discussed herein for embodiments of the disclosure. The logic device 1410 may be configured to interface and communicate with the various other components (e.g., 1415, 1420, 1425, 1430, 1435, 1440, 1445, etc.) of the imaging system 1400 to perform such operations. In one aspect, the logic device 1410 may be configured to perform various system control operations (e.g., to control communications and operations of various components of the imaging system 1400) and other image processing operations (e.g., debayering, sharpening, color correction, offset correction, bad pixel replacement, data conversion, data transformation, data compression, video analytics, etc.).

The memory component 1415 includes, in one embodiment, one or more memory devices configured to store data and information, including infrared image data and information. The memory component 1415 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the logic device 1410 may be configured to execute software instructions stored in the memory component 1415 so as to perform method and process steps and/or operations. The logic device 1410 and/or the image interface 1425 may be configured to store in the memory component 1415 images or digital image data captured by the image capture component 1420.

In some embodiments, a separate machine-readable medium 1450 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 1450 may be portable and/or located separate from the imaging device 1405, with the stored software instructions and/or data provided to the imaging device 1405 by coupling the machine-readable medium 1450 to the imaging device 1405 and/or by the imaging device 1405 downloading (e.g., via a wired link and/or a wireless link) from the machine-readable medium 1450. It should be appreciated that various modules may be integrated in software and/or hardware as part of the logic device 1410, with code (e.g., software or configuration data) for the modules stored, for example, in the memory component 1415.

The imaging device 1405 may be a video and/or still camera to capture and process images and/or videos of a scene 1475. In this regard, the image capture component 1420 of the imaging device 1405 may be configured to capture images (e.g., still and/or video images) of the scene 1475 in a particular spectrum or modality. The image capture component 1420 includes an image detector circuit 1465 (e.g., a visible-light detector circuit, a thermal infrared detector circuit) and a readout circuit 1470 (e.g., an ROIC). For example, the image capture component 1420 may include an IR imaging sensor (e.g., IR imaging sensor array) configured to detect IR radiation in the near, middle, and/or far IR spectrum and provide IR images (e.g., IR image data or signal) representative of the IR radiation from the scene 1475. For example, the image detector circuit 1465 may capture (e.g., detect, sense) IR radiation with wavelengths in the range from around 700 nm to around 2 mm, or portion thereof. For example, in some aspects, the image detector circuit 1465 may be sensitive to (e.g., better detect) SWIR radiation, MWIR radiation (e.g., EM radiation with wavelength of 2 µm to 5 µm), and/or LWIR radiation (e.g., EM radiation with wavelength of 7 µm to 14 µm), or any desired IR wavelengths (e.g., generally in the 0.7 µm to 14 µm range). In other aspects, the image detector circuit 1465 may capture radiation from one or more other wavebands of the EM spectrum, such as visible light, ultraviolet light, and so forth.

The image detector circuit 1465 may capture image data (e.g., infrared image data) associated with the scene 1475. To capture a detector output image, the image detector circuit 1465 may detect image data of the scene 1475 (e.g., in the form of EM radiation) received through an aperture 1480 of the imaging device 1405 and generate pixel values of the image based on the scene 1475. An image may be referred to as a frame or an image frame. In some cases, the image detector circuit 1465 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The detector output image may be, or may be considered, a data structure that includes pixels and is a representation of the image data associated with the scene 1475, with each pixel having a pixel value that represents EM radiation emitted or reflected from a portion of the scene 1475 and received by a detector that generates the pixel value. Based on context, a pixel may refer to a detector of the image detector circuit 1465 that generates an associated pixel value or a pixel (e.g., pixel location, pixel coordinate) of the detector output image formed from the generated pixel values. In one example, the detector output image may be an infrared image (e.g., thermal infrared image). For a thermal infrared image (e.g., also referred to as a thermal image), each pixel value of the thermal infrared image may represent a temperature of a corresponding portion of the scene 1475. In another example, the detector output image may be a visible-light image.

In an aspect, the pixel values generated by the image detector circuit 1465 may be represented in terms of digital count values generated based on the electrical signals obtained from converting the detected radiation. For example, in a case that the image detector circuit 1465 includes or is otherwise coupled to an ADC circuit, the ADC circuit may generate digital count values based on the electrical signals. In some embodiments, the ADC circuit may be a multi-ranging ADC circuit, such as a two-slope ADC circuit. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 1465 (e.g., an IR image detector circuit) is associated with higher digital count values and higher temperatures.

The readout circuit 1470 may be utilized as an interface between the image detector circuit 1465 that detects the image data and the logic device 1410 that processes the detected image data as read out by the readout circuit 1470, with communication of data from the readout circuit 1470 to the logic device 1410 facilitated by the image interface 1425. An image capturing frame rate may refer to the rate (e.g., detector output images per second) at which images are detected/output in a sequence by the image detector circuit 1465 and provided to the logic device 1410 by the readout circuit 1470. The readout circuit 1470 may read out the pixel values generated by the image detector circuit 1465 in accordance with an integration time (e.g., also referred to as an integration period).

In various embodiments, a combination of the image detector circuit 1465 and the readout circuit 1470 may be, may include, or may together provide an FPA. In some aspects, the image detector circuit 1465 may be a thermal image detector circuit that includes an array of microbolometers, and the combination of the image detector circuit 1465 and the readout circuit 1470 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 1420 may include one or more optical components and/or one or more filters. The optical component(s) may include one or more windows, lenses, mirrors, beamsplitters, beam couplers, and/or other components to direct and/or focus radiation to the image detector circuit 1465. The optical component(s) may include components each formed of material and appropriately arranged according to desired transmission characteristics, such as desired transmission wavelengths and/or ray transfer matrix characteristics. The filter(s) may be adapted to pass radiation of some wavelengths but substantially block radiation of other wavelengths. For example, the image capture component 1420 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 1420 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 1420 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 1420 may include a complementary metal oxide semiconductor (CMOS) sensor or a charge-coupled device (CCD) sensor that can be found in any consumer camera (e.g., visible light camera).

In some embodiments, the imaging system 1400 includes a shutter 1485. The shutter 1485 may be operated to selectively inserted into an optical path between the scene 1475 and the image capture component 1420 to expose or block the aperture 1480. In some cases, the shutter 1485 may be moved (e.g., slid, rotated, etc.) manually (e.g., by a user of the imaging system 1400) and/or via an actuator (e.g., controllable by the logic device 1410 in response to user input or autonomously, such as an autonomous decision by the logic device 1410 to perform a calibration of the imaging device 1405). When the shutter 1485 is outside of the optical path to expose the aperture 1480, the electromagnetic radiation from the scene 1475 may be received by the image detector circuit 1465 (e.g., via one or more optical components and/or one or more filters). As such, the image detector circuit 1465 captures images of the scene 1475. The shutter 1485 may be referred to as being in an open position or simply as being open. When the shutter 1485 is inserted into the optical path to block the aperture 1480, the electromagnetic radiation from the scene 1475 is blocked from the image detector circuit 1465. As such, the image detector circuit 1465 captures images of the shutter 1485. The shutter 1485 may be referred to as being in a closed position or simply as being closed. In some cases, the shutter 1485 may block the aperture 1480 during a calibration process, in which the shutter 1485 may be used as a uniform blackbody (e.g., a substantially uniform blackbody). For example, the shutter 1485 may be used as a single temperature source or substantially single temperature source. In some cases, the shutter 1485 may be temperature controlled to provide a temperature controlled uniform blackbody (e.g., to present a uniform field of radiation to the image detector circuit 1465). For example, in some cases, a surface of the shutter 1485 imaged by the image detector circuit 1465 may be implemented by a uniform blackbody coating. In some cases, such as for an imaging device without a shutter or with a broken shutter or as an alternative to the shutter 1485, a case or holster of the imaging device 1405, a lens cap, a cover, a wall of a room, or other suitable object/surface may be used to provide a uniform blackbody (e.g., substantially uniform blackbody) and/or a single temperature source (e.g., substantially single temperature source).

Other imaging sensors that may be embodied in the image capture component 1420 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 1420 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 1425 may include, in some embodiments, appropriate input ports, connectors, switches, and/or circuitry configured to interface with external devices (e.g., a remote device 1455 and/or other devices) to receive images (e.g., digital image data) generated by or otherwise stored at the external devices. In an aspect, the image interface 1425 may include a serial interface and telemetry line for providing metadata associated with image data. The received images or image data may be provided to the logic device 1410. In this regard, the received images or image data may be converted into signals or data suitable for processing by the logic device 1410. For example, in one embodiment, the image interface 1425 may be configured to receive analog video data and convert it into suitable digital data to be provided to the logic device 1410.

The image interface 1425 may include various standard video ports, which may be connected to a video player, a video camera, or other devices capable of generating standard video signals, and may convert the received video signals into digital video/image data suitable for processing by the logic device 1410. In some embodiments, the image interface 1425 may also be configured to interface with and receive images (e.g., image data) from the image capture component 1420. In other embodiments, the image capture component 1420 may interface directly with the logic device 1410.

The control component 1430 includes, in one embodiment, a user input and/or an interface device, such as a rotatable knob (e.g., potentiometer), push buttons, slide bar, keyboard, and/or other devices, that is adapted to generate a user input control signal. The logic device 1410 may be configured to sense control input signals from a user via the control component 1430 and respond to any sensed control input signals received therefrom. The logic device 1410 may be configured to interpret such a control input signal as a value, as generally understood by one skilled in the art. In one embodiment, the control component 1430 may include a control unit (e.g., a wired or wireless handheld control unit) having push buttons adapted to interface with a user and receive user input control values. In one implementation, the push buttons and/or other input mechanisms of the control unit may be used to control various functions of the imaging device 1405, such as calibration initiation and/or related control, shutter control, autofocus, menu enable and selection, field of view, brightness, contrast, noise filtering, image enhancement, and/or various other features.

The display component 1435 includes, in one embodiment, an image display device (e.g., a liquid crystal display (LCD)) or various other types of generally known video displays or monitors. The logic device 1410 may be configured to display image data and information on the display component 1435. The logic device 1410 may be configured to retrieve image data and information from the memory component 1415 and display any retrieved image data and information on the display component 1435. The display component 1435 may include display circuitry, which may be utilized by the logic device 1410 to display image data and information. The display component 1435 may be adapted to receive image data and information directly from the image capture component 1420, logic device 1410, and/or image interface 1425, or the image data and information may be transferred from the memory component 1415 via the logic device 1410. In some aspects, the control component 1430 may be implemented as part of the display component 1435. For example, a touchscreen of the imaging device 1405 may provide both the control component 1430 (e.g., for receiving user input via taps and/or other gestures) and the display component 1435 of the imaging device 1405.

The sensing component 1440 includes, in one embodiment, one or more sensors of various types, depending on the application or implementation requirements, as would be understood by one skilled in the art. Sensors of the sensing component 1440 provide data and/or information to at least the logic device 1410. In one aspect, the logic device 1410 may be configured to communicate with the sensing component 1440. In various implementations, the sensing component 1440 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 1440 may represent conventional sensors as generally known by one skilled in the art for monitoring various conditions (e.g., environmental conditions) that may have an effect (e.g., on the image appearance) on the image data provided by the image capture component 1420.

In some implementations, the sensing component 1440 (e.g., one or more sensors) may include devices that relay information to the logic device 1410 via wired and/or wireless communication. For example, the sensing component 1440 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the logic device 1410 can use the information (e.g., sensing data) retrieved from the sensing component 1440 to modify a configuration of the image capture component 1420 (e.g., adjusting a light sensitivity level, adjusting a direction or angle of the image capture component 1420, adjusting an aperture, etc.). The sensing component 1440 may include a temperature sensing component to provide temperature data (e.g., one or more measured temperature values) various components of the imaging device 1405, such as the image detection circuit 1465 and/or the shutter 1485. By way of non-limiting examples, a temperature sensor may include a thermistor, thermocouple, thermopile, pyrometer, and/or other appropriate sensor for providing temperature data.

In some embodiments, various components of the imaging system 1400 may be distributed and in communication with one another over a network 1460. In this regard, the imaging device 1405 may include a network interface 1445 configured to facilitate wired and/or wireless communication among various components of the imaging system 1400 over the network 1460. In such embodiments, components may also be replicated if desired for particular applications of the imaging system 1400. That is, components configured for same or similar operations may be distributed over a network. Further, all or part of any one of the various components may be implemented using appropriate components of the remote device 1455 (e.g., a conventional digital video recorder (DVR), a computer configured for image processing, and/or other device) in communication with various components of the imaging system 1400 via the network interface 1445 over the network 1460, if desired. Thus, for example, all or part of the logic device 1410, all or part of the memory component 1415, and/or all of part of the display component 1435 may be implemented or replicated at the remote device 1455. In some embodiments, the imaging system 1400 may not include imaging sensors (e.g., image capture component 1420), but instead receive images or image data from imaging sensors located separately and remotely from the logic device 1410 and/or other components of the imaging system 1400. It will be appreciated that many other combinations of distributed implementations of the imaging system 1400 are possible, without departing from the scope and spirit of the disclosure.

Furthermore, in various embodiments, various components of the imaging system 1400 may be combined and/or implemented or not, as desired or depending on the application or requirements. In one example, the logic device 1410 may be combined with the memory component 1415, image capture component 1420, image interface 1425, display component 1435, sensing component 1440, and/or network interface 1445. In another example, the logic device 1410 may be combined with the image capture component 1420, such that certain functions of the logic device 1410 are performed by circuitry (e.g., a processor, a microprocessor, a logic device, a microcontroller, etc.) within the image capture component 1420.

Figure 15:
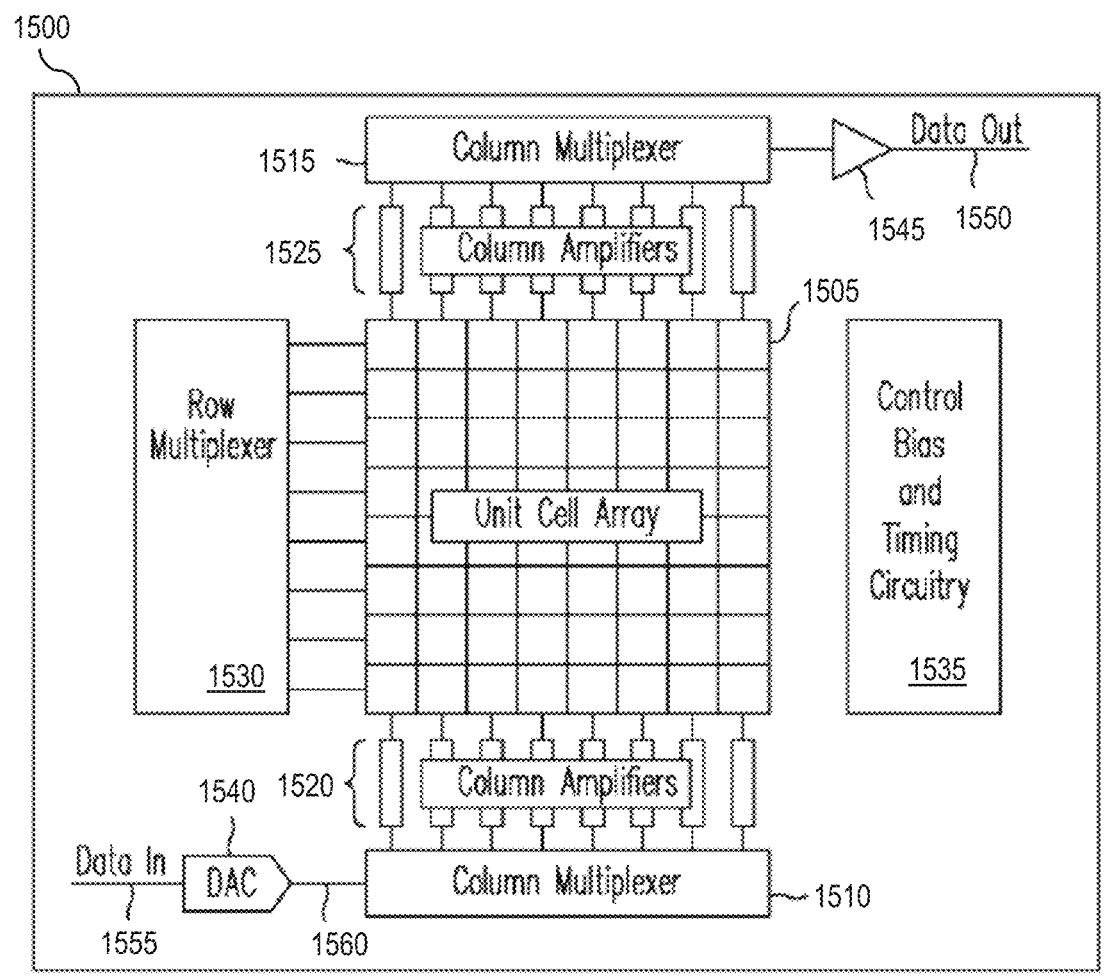
FIG. 15 illustrates a block diagram of an example image sensor assembly in accordance with one or more embodiments of the present disclosure.

FIG. 15 illustrates a block diagram of an example image sensor assembly 1500 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 1500 may be an FPA, for example, implemented as the image capture component 1420 of FIG. 14.

The image sensor assembly 1500 includes a unit cell array 1505, column multiplexers 1510 and 1515, column amplifiers 1520 and 1525, a row multiplexer 1530, control bias and timing circuitry 1535, a digital-to-analog converter (DAC) 1540, and a data output buffer 1545. In some aspects, operations of and/or pertaining to the unit cell array 1505 and other components may be performed according to a system clock and/or synchronization signals (e.g., line synchronization (LSYNC) signals). The unit cell array 1505 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 1515, column amplifiers 1520, row multiplexer 1530, and data output buffer 1545 may be used to provide the output signals from the unit cell array 1505 as a data output signal on a data output line 1550. The output signals on the data output line 1550 may be provided to components downstream of the image sensor assembly 1500, such as processing circuitry (e.g., the logic device 1410 of FIG. 14), memory (e.g., the memory component 1415 of FIG. 14), display device (e.g., the display component 1435 of FIG. 14), and/or other component to facilitate processing, storage, and/or display of the output signals. The data output signal may be an image formed of the pixel values for the image sensor assembly 1500. In this regard, the column multiplexer 1515, the column amplifiers 1520, the row multiplexer 1530, and the data output buffer 1545 may collectively provide an ROIC (or portion thereof) of the image sensor assembly 1500. In an aspect, the interface circuitry may be considered part of the ROIC, or may be considered an interface between the detectors and the ROIC. In some embodiments, components of the image sensor assembly 1500 may be implemented such that the unit cell array 1505 and the ROIC may be part of a single die.

The column amplifiers 1525 may generally represent any column processing circuitry as appropriate for a given application (analog and/or digital), and is not limited to amplifier circuitry for analog signals. In this regard, the column amplifiers 1525 may more generally be referred to as column processors in such an aspect. Signals received by the column amplifiers 1525, such as analog signals on an analog bus and/or digital signals on a digital bus, may be processed according to the analog or digital nature of the signal. As an example, the column amplifiers 1525 may include circuitry for processing digital signals. As another example, the column amplifiers 1525 may be a path (e.g., no processing) through which digital signals from the unit cell array 1505 traverses to get to the column multiplexer 1515. As another example, the column amplifiers 1525 may include an ADC for converting analog signals to digital signals (e.g., to obtain digital count values). These digital signals may be provided to the column multiplexer 1515.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 1535 may generate the bias signals and provide them to the unit cells. By providing appropriate bias signals to each unit cell, the unit cell array 1505 may be effectively calibrated to provide accurate image data in response to light (e.g., visible-light, IR light) incident on the detectors of the unit cells. In an aspect, the control bias and timing circuitry 1535 may be, may include, or may be a part of, a logic circuit.

The control bias and timing circuitry 1535 may generate control signals for addressing the unit cell array 1505 to allow access to and readout of image data from an addressed portion of the unit cell array 1505. The unit cell array 1505 may be addressed to access and readout image data from the unit cell array 1505 row by row, although in other implementations the unit cell array 1505 may be addressed column by column or via other manners.

The control bias and timing circuitry 1535 may generate bias values and timing control voltages. In some cases, the DAC 1540 may convert the bias values received as, or as part of, data input signal on a data input signal line 1555 into bias signals (e.g., analog signals on analog signal line(s) 1560) that may be provided to individual unit cells through the operation of the column multiplexer 1510, column amplifiers 1520, and row multiplexer 1530. For example, the DAC 1540 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 1535 may generate the bias signals (e.g., analog signals) and provide the bias signals to the unit cells without utilizing the DAC 1540. In this regard, some implementations do not include the DAC 1540, data input signal line 1555, and/or analog signal line(s) 1560. In an embodiment, the control bias and timing circuitry 1535 may be, may include, may be a part of, or may otherwise be coupled to the logic device 1410 and/or image capture component 1420 of FIG. 14.

In an embodiment, the image sensor assembly 1500 may be implemented as part of an imaging device (e.g., the imaging device 1405). In addition to the various components of the image sensor assembly 1500, the imaging device may also include one or more processors, memories, logic, displays, interfaces, optics (e.g., lenses, mirrors, beamsplitters), and/or other components as may be appropriate in various implementations. In an aspect, the data output signal on the data output line 1550 may be provided to the processors (not shown) for further processing. For example, the data output signal may be an image formed of the pixel values from the unit cells of the image sensor assembly 1500. The processors may perform operations such as non-uniformity correction (e.g., flat-field correction or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 15 may be implemented on a single chip or multiple chips. Furthermore, while the various components are illustrated as a set of individual blocks, various of the blocks may be merged together or various blocks shown in FIG. 15 may be separated into separate blocks.

It is noted that in FIG. 15 the unit cell array 1505 is depicted as an 8×8 (e.g., 8 rows and 8 columns of unit cells. However, the unit cell array 1505 may be of other array sizes. By way of non-limiting examples, the unit cell array 1505 may include 160×120 (e.g., 160 rows and 120 columns of unit cells), 512×512, 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

It is noted that dimensional aspects provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect. Similarly, aspects related to distances between features also have associated tolerances.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. An imaging device comprising:
a lens system comprising:
a first lens comprises a first spherical surface and a second spherical surface opposite the first spherical surface, wherein the first lens is configured to transmit electromagnetic radiation associated with a scene, wherein the first lens is associated with a first field of view;
a second lens comprises a first wafer level optics (WLO) aspherical lens element, wherein the second lens is configured to receive the electromagnetic radiation from the first lens and transmit the electromagnetic radiation, and wherein the second lens is spaced apart from the first lens by a first lens-free gap; and
a third lens comprises a second WLO aspherical lens element, wherein the third lens is configured to receive the electromagnetic radiation from the second lens and transmit the electromagnetic radiation, wherein the third lens is spaced apart from the second lens by a second lens-free gap, and wherein the second lens and the third lens are collectively associated with a second field of view narrower than the first field of view;
a window configured to receive the electromagnetic radiation from the third lens and transmit the electromagnetic radiation, wherein the window is spaced apart from the third lens by a third lens-free gap; and
a detector array comprising a plurality of detectors, wherein the detector array is spaced apart from the window by a fourth lens-free gap, and wherein each of the plurality of detectors is configured to receive a portion of the electromagnetic radiation from the lens system and generate a thermal image based on the received portion of the electromagnetic radiation.

2. The imaging device of claim 1, wherein the first field of view is between around 110° and around 220°.

3. The imaging device of claim 2, wherein the first field of view is between around 120° and around 160°.

4. The imaging device of claim 2, wherein the second field of view is between around 50° and around 70°.

5. The imaging device of claim 1, further comprising a shutter configured to be selectively inserted between the first lens and the second lens.

6. The imaging device of claim 1, further comprising:
a lens barrel configured to receive the first lens, the second lens, and the third lens; and
a housing, wherein the lens barrel is coupled to the housing.

7. The imaging device of claim 6, wherein the lens barrel comprises:
a first lens barrel portion configured to receive the first lens; and
a second lens barrel portion configured to couple to the first lens barrel portion and receive the second and third lenses.

8. The imaging device of claim 1, wherein the electromagnetic radiation comprises long-wave infrared light.

9. The imaging device of claim 1, further comprising:
a logic device configured to process the thermal image to obtain a processed image; and
a display device configured to display the thermal image and/or the processed image, wherein the detector array comprises an array of microbolometers.

10. A method of manufacturing the imaging device of claim 1, the method comprising:
- providing the detector array;
- disposing the detector array within a housing;
- disposing the second and third lenses within a first portion of a lens barrel;
- coupling the first portion of the lens barrel to the housing;
- performing a calibration of the second and third lenses to obtain a gain map;
- disposing the first lens within a second portion of the lens barrel; and
- after the calibration, coupling the second portion of the lens barrel to the first portion of the lens barrel.

11. The method of claim 10, further comprising:
- forming the second and third lenses using one or more WLO manufacturing processes; and/or
- forming the first lens using one or more grinding processes and/or one or more polishing processes.

12. The method of claim 10, wherein the first field of view is between around 110° and around 220°.

13. The method of claim 10, wherein the performing the calibration comprises:
- positioning a reference object in the second field of view;
- capturing, using the second and third lenses, image data of the reference object; and
- determining the gain map based on the image data.

14. The method of claim 10, further comprising:
- positioning a front lens element in the second field of view;
- focusing the front lens element and the second and third lenses relative to the detector array; and
- removing the front lens element,
- wherein the calibration is performed after the removing and with the second and third lenses positioned according to the focusing.

15. The imaging device of claim 1, wherein the second WLO aspherical lens element has a planar surface facing the detector array.

16. The imaging device of claim 15, wherein the second WLO aspherical lens element has a convex surface opposite the planar surface.

17. The imaging device of claim 1, wherein the first WLO aspherical lens element is a plano-convex lens element having a planar surface facing the second spherical surface and a convex surface opposite the planar surface.

18. A method comprising:
- directing, by a window and a lens system comprising a first lens, a second lens, and a third lens, electromagnetic radiation associated with a scene to a detector array, wherein the first lens is associated with a first field of view and comprises a first spherical surface and a second spherical surface opposite the first spherical surface, wherein the second lens comprises a first wafer level optics (WLO) aspherical lens element, wherein the third lens comprises a second WLO aspherical lens element, wherein the second lens and the third lens are collectively associated with a second field of view narrower than the first field of view, wherein the second lens is spaced apart from the first lens by a first lens-free gap, wherein the third lens is spaced apart from the second lens by a second lens-free gap, and wherein the window is spaced apart from the third lens by a third lens-free gap;
- receiving, by the detector array, the electromagnetic radiation from the lens system, wherein the detector array is spaced apart from the window by a fourth lens-free gap; and
- generating, by the detector array, a thermal image based on the received electromagnetic radiation and a gain map, wherein the gain map is based on a collective calibration of the second and third lenses.

19. The method of claim 18, wherein the directing comprises:
- directing, by the first lens, the electromagnetic radiation to the second lens;
- directing, by the second lens, the electromagnetic radiation to the third lens;
- directing, by the third lens, the electromagnetic radiation to the window; and
- directing, by the window, the electromagnetic radiation to the detector array, wherein the gain map is based on the calibration of the second and third lenses by inserting a shutter between the first lens and the second lens.

20. The method of claim 18, further comprising displaying, by a display device, the thermal image, wherein the electromagnetic radiation comprises long-wave infrared light, and wherein the first field of view is between around 110° and around 220°.

* * * * *